US012612482B2

(12) United States Patent
Ragunathan

(10) Patent No.: US 12,612,482 B2
(45) Date of Patent: Apr. 28, 2026

(54) COMBINATION OF CROSSLINKERS TO IMPROVE COATING PROPERTIES

(71) Applicant: BASF SE, Ludwigshafen am Rhein (DE)

(72) Inventor: Kaliappa Ragunathan, Charlotte, NC (US)

(73) Assignee: BASF SE, Ludwigshafen am Rhein (DE)

( * ) Notice: Subject to any disclaimer, the term of this patent is extended or adjusted under 35 U.S.C. 154(b) by 934 days.

(21) Appl. No.: 17/785,889

(22) PCT Filed: Dec. 14, 2020

(86) PCT No.: PCT/US2020/064900

§ 371 (c)(1),
(2) Date: Jun. 15, 2022

(87) PCT Pub. No.: WO2021/126780

PCT Pub. Date: Jun. 24, 2021

(65) Prior Publication Data

US 2023/0012924 A1 Jan. 19, 2023

Related U.S. Application Data

(60) Provisional application No. 62/951,304, filed on Dec. 20, 2019.

(51) Int. Cl.

| | |
|---|---|
| ***C08F 257/02*** | (2006.01) |
| ***C08F 212/08*** | (2006.01) |
| ***C09D 125/06*** | (2006.01) |
| ***C09D 151/00*** | (2006.01) |

(52) U.S. Cl.

CPC .......... *C08F 257/02* (2013.01); *C08F 212/08* (2013.01); *C09D 125/06* (2013.01); *C09D 151/006* (2013.01)

(58) Field of Classification Search

CPC ...... C08F 212/08; C08F 257/02; C08F 2/001; C08F 220/14; C08F 220/1804; C08F 220/36; C08F 222/02; C08F 222/103; C08F 220/283

See application file for complete search history.

(56) References Cited

U.S. PATENT DOCUMENTS

| | | | |
|---|---|---|---|
| 5,869,590 | A | 2/1999 | Clark et al. |
| 6,090,882 | A | 7/2000 | Trumbo et al. |
| 9,534,158 | B2 | 1/2017 | Fujimoto et al. |
| 2008/0058473 | A1 | 3/2008 | Freidzon et al. |
| 2012/0121903 | A1* | 5/2012 | Betremieux .......... C08F 265/00 428/375 |
| 2012/0252972 | A1 | 10/2012 | Balk et al. |
| 2015/0370185 | A1* | 12/2015 | Kurokawa ........... G03G 9/0804 430/137.15 |
| 2016/0289489 | A1 | 10/2016 | Betremieux et al. |

FOREIGN PATENT DOCUMENTS

| | | | |
|---|---|---|---|
| CN | 1264403 | A | 8/2000 |
| EP | 0545377 | A1 | 6/1993 |
| EP | 0986611 | A1 | 3/2000 |
| EP | 3523381 | A1 | 8/2019 |
| WO | 98/54256 | A1 | 12/1998 |
| WO | 2008/028062 | A2 | 3/2008 |
| WO | 2011/009560 | A1 | 1/2011 |
| WO | 2018/065558 | A1 | 4/2018 |
| WO | 2018/207078 | A1 | 11/2018 |

OTHER PUBLICATIONS

International Preliminary Report on Patentability received for PCT Patent Application No. PCT/US2020/064900, mailed on Jun. 30, 2022, 12 pages.

International Search Report and Written Opinion received for PCT Patent Application No. PCT/US2020/064900, mailed on Apr. 1, 2021, 17 pages.

Zhang, X., et al., "The Diacetone Acrylamide Crosslinking Reaction and Its Control of Core-Shell Polyacrylate Latices at Ambient Temperature," Journal of Applied Polymer Science, vol. 123, No. 3, Feb. 5, 2012, pp. 7.

* cited by examiner

*Primary Examiner* — Mark S Kaucher

(74) *Attorney, Agent, or Firm* — Faegre Drinker Biddle & Reath LLP

(57) ABSTRACT

Multiphase polymers comprising crosslinking monomers and polyfunctional amine are disclosed. The multiphase polymer comprises a first phase polymer having a Tg from 60° C. to 240° C., a second phase polymer having a Tg from 40° C. to 240° C., and a soft phase polymer having a Tg from −25° C. to 30° C. The crosslinking monomers include a triacrylate such as trimethylol propane triacrylate, an unsaturated alkoxysilane, and an unsaturated keto monomer reactive with the polyfunctional amine. In contrast to conventional knowledge, incorporation of trimethylolpropane triacrylate reduces the minimum film forming temperature of multiphase polymers. This unusual reduction in MFFT helps to reduce the VOC requirement to form a good film at low VOC. The other crosslinking monomers including unsaturated alkoxy silane and unsaturated keto monomer which react with the polyfunctional amine improve print resistance, block resistance and lower the tackiness of paint films. The multiphase polymer is particularly suitable for use in deep base paints.

19 Claims, No Drawings

COMBINATION OF CROSSLINKERS TO IMPROVE COATING PROPERTIES

CROSS-REFERENCE TO RELATED APPLICATIONS

This application is a national stage application (under 35 U.S.C. § 371) of PCT/US2020/064900, filed Dec. 14, 2020, which claims benefit of U.S. Application No. 62/951,304, filed Dec. 20, 2019, both of which are incorporated herein by reference in their entirety.

FIELD OF THE DISCLOSURE

The present disclosure relates to coating compositions including a binder exhibiting lower minimum film-forming temperature, high pendulum hardness, high block resistance, high print resistance, and low tackiness.

BACKGROUND

Coatings having a low pigment volume concentration (PVC), for example deep base architectural paints, are comparatively softer to coatings having high PVC. These coatings become even softer by the presence of soft polymers generally used to form good films at low volatile organic compounds (VOC) concentrations. Large amounts of low VOC waterborne colorants are generally included in these coatings to achieve the deep colors, which further soften the coatings. The soft and tacky deep base coatings caused by the combination of low PVC, soft polymers, and large amounts of waterborne colorants which carry soft materials result in a tacky surface, poor block resistance, and poor print resistance. There is a need to solve the tackiness and poor block and print resistance of low PVC, low VOC, and deep base coatings. The compositions and methods described herein address these and other needs.

SUMMARY OF THE DISCLOSURE

Disclosed herein are multiphase polymer particles comprising a combination of crosslinking monomers and polyfunctional amine which form a film at low VOC and provide improved hardness, improved print resistance, improved block resistance and lower tackiness in deep base paints. In some cases, the multiphase polymer particles comprise a multifunctional acrylate trimethylol propane triacrylate, an unsaturated alkoxysilane such as vinyltriethoxy silane, an unsaturated keto monomer such as acetoacetoxyethyl methacrylate or diacetone acrylamide, and a poly amine which reacts with keto monomers. In contrast to conventional knowledge, incorporation of trimethylolpropane triacrylate reduces the minimum film forming temperature of the multiphase polymer particles. This unusual reduction in MFFT helps to reduce the VOC requirement to form a good film at low VOC. The other crosslinking monomers including unsaturated alkoxy silane and unsaturated keto monomer which react with the polyfunctional amine improve print resistance, block resistance and lower the tackiness of the deep base coatings. The polymer particles are synthesized in multiple phases differing in Tg.

In some embodiments, the first phase is a hard phase polymer having a glass transition temperature of from 60° C. to 240° C., the second phase polymer has a glass transition temperature of from 40° C. to 240° C., and the third phase is a soft phase polymer having a glass transition temperature of from −25° C. to 30° C. The first phase polymer generally has no acid groups from polymerized monomers, and the second phase polymer has acid groups from polymerized unsaturated monomers such as a carboxylic acid monomer, sulfur acid monomers or phosphorous acid monomers. The soft phase polymer may or may not have any acid groups from polymerized unsaturated monomers. These unusually crosslinked polymer particles by multiple crosslinking agents provide improved hardness, improved block resistance, improved print resistance, and lower tackiness to low VOC and low PVC deep base coatings.

In some examples, the multiphase polymer can comprise a first phase polymer having a Tg of from 60° C. to 240° C. (e.g., from 80° C. to 240° C., or from 80° C. to 150° C.); a second phase polymer having a Tg of from 40° C. to 240° C. (e.g., from 60° C. to 240° C., or from 70° C. to 120° C.) and is derived from monomers including an ethylenically unsaturated acid monomer, one or more multifunctional crosslinking monomers, one or more (meth)acrylates, and optionally an unsaturated keto monomer, an unsaturated silane monomer, a polyfunctional amine which reacts with the keto monomer, styrene, or a combination thereof; and a soft phase polymer having a Tg of from −25° C. to 30° C. (e.g., from −25° C. to 15° C., or from −15° C. to less than 15° C.) and is derived from monomers including one or more multifunctional crosslinking monomers, one or more (meth)acrylates, an unsaturated keto monomer, an unsaturated silane monomer, a polyfunctional amine which reacts with the unsaturated keto monomer, and optionally styrene.

The first phase polymer can be derived from monomers including a methacrylate monomer, a vinyl aromatic monomer, or a combination thereof. For example, the first phase polymer can comprise styrene in an amount greater than 0% by weight, such as from 10% to 100% by weight, or preferably from 40% to 100% by weight, based on a total weight of the first phase polymer. In certain embodiments, the first phase polymer is a polystyrene seed polymer. The first phase polymer can be present in an amount of 10% by weight or less, preferably from 0.1% to 10% by weight, or more preferably from 1% to 5% by weight, based on a total weight of the multiphase polymer. The first phase polymer can have a volume average particle size diameter of 60 nm or less, such as from 5 nm to 30 nm.

In some aspects, the second phase polymer can be derived from an ethylenically unsaturated acid monomer, one or more multifunctional crosslinking monomers, one or more (meth)acrylates, an unsaturated keto monomer, an unsaturated silane monomer, a polyfunctional amine which reacts with the keto monomer, and optionally styrene. The ethylenically unsaturated acid monomer in the second phase polymer can be selected from a carboxylic acid monomer, a phosphorous acid monomer, a sulfur acid monomer, or a mixture thereof. Examples of suitable ethylenically unsaturated acid monomers include acrylic acid; methacrylic acid; itaconic acid; maleic acid; fumaric acid; crotonic acid; a phosphorous acid monomer; a vinyl phosphonic acid; allyl phosphonic acid; 2-acrylamido-2-methylpropanephosphonic acid; a phosphonostyrene; 2-methylacrylamido-2-methylpropane phosphonic acid; phosphate or phosphonate esters of hydroxy alkyl unsaturated monomers such as 2-phosphoethyl(meth)acrylate; 2-phosphopropyl(meth)acrylate; 3-phosphopropyl(meth)acrylate; 3-phospho-2-hydroxypropyl(meth)acrylate; 2-acrylamido-2-methyl propane sulfonic acid; styrene sulfonic acid; a mixture thereof, or a salt thereof. The phosphorous acid monomer can have a formula $CH_2{=}C(R){-}C(O){-}O{-}(R^1O)_n{-}P(O)(OH)_2$, where R is H or $CH_3$, $R^1$ is alkyl, and n is from 0 to 50. Alternately, the phosphorous acid monomer can be a monomer sold under the trade name Sipomer® PAM 100, Sipomer® PAM 200, Sipomer PAM 600 or Sipomer® PAM 4000. The ethylenically unsaturated acid monomer can be present in the second phase polymer, in an amount from 0.01% to 6%, preferably from 0.5% to 3.0% by weight of the second phase polymer.

As described herein, the soft phase polymer may or may not include an acid monomer. In some embodiments, one or both of the soft phase polymer and the first phase polymer do not include an acid monomer. In some embodiments, only the first phase polymer do not include an acid monomer. When present, the ethylenically unsaturated acid monomer can be present in the soft phase polymer, in an amount from 0.01% to 6%, preferably from 0.5% to 3.0% by weight of the soft phase polymer.

Both the second phase polymer and the soft phase polymer include one or more multifunctional crosslinking monomers. The multifunctional crosslinking monomer can include two or more polymerizable carbon-carbon double bonds. For example, the multifunctional crosslinking monomer can be selected from a divinyl monomer, a diallyl monomer, a trivinyl monomer, a triallyl monomer, a di(meth)acrylate, a tri(meth)acrylate, a tetra(meth)acrylate, a penta(meth)acrylate), or a combination thereof. Multifunctional crosslinking monomers also include divinyl(meth)acrylate, diallyl(meth)acrylate, allyl(meth)acrylate, trivinyl(meth) acrylate, triallyl(meth)acrylate, divinyl benzene, trivinylbenzene, diallyl maleate, or a combination thereof. In some examples, the multifunctional crosslinking monomer comprises a tri(meth)acrylate, preferably trimethylolpropane triacrylate.

Without wishing to be bound by theory, it is believed including trimethylol propane triacrylate in both the second phase polymer and the soft phase polymer increases phase separation between the second phase and soft phase polymer. This increase in phase separation consequently decreases the minimum film forming temperature of the multiphase polymer. The multifunctional crosslinking monomer such as trimethylol propane triacrylate can be present in the second phase polymer in an amount from 0.01% to 5% by weight, such as from 0.2% to 5% by weight or preferably from 0.5% to 5% by weight of the second phase polymer. The multifunctional crosslinking monomer such as trimethylol propane triacrylate can be present in the soft phase polymer in an amount from 0.01% to 5% by weight, such as from 0.2% to 5% by weight or preferably from 0.5% to 5% by weight of the soft phase polymer. The multifunctional crosslinking monomer such as trimethylol propane triacrylate can be present in the multiphase polymer in an amount from 0.02% to 10% by weight, from 0.2% to 10% by weight, from 0.2% to 5% by weight, or from 0.5% to 5% by weight of the multiphase polymer.

The multiphase polymer also includes an unsaturated keto monomer. The unsaturated keto monomer can be selected from diacetone acrylamide, an acetoacetoxyalkyl(meth) acrylate such as acetoacetoxyethyl methacrylate, or a combination thereof. The unsaturated keto monomer can be present in the soft phase polymer in an amount from 0.01% to 15%, from 0.01% to 10%, preferably from 0.5% to 10%, more preferably from 0.5% to 5% by weight of the soft phase polymer. The unsaturated keto monomer can also be present in the second phase polymer in an amount from 0.01% to 15%, preferably from 0.5% to 15%, more preferably from 0.5% to 5% by weight of the second phase polymer.

As described herein, the multiphase polymer includes a polyfunctional amine such as a polyetheramine or polyhydrazide. The polyfunctional amine reacts with the ketone of the keto monomer present in soft phase polymer and/or the second phase polymer. The polyfunctional amine is reacted with the unsaturated keto monomer after formation of the soft phase polymer and/or the second phase polymer and thus can be present as a group pendant from the backbone of the polymer. The polyfunctional amine can be present in the multiphase polymer in an amount from 0.01% to 3%, preferably from 0.5% to 2% by weight of the multiphase polymer. In some embodiments, polyetheramine or polyhydrazide or a combination thereof are incorporated at a ratio of 1:0.1 to 1:1.2 equivalent ratio of keto to amine groups or hydrazide groups or a combination of amine and hydrazide groups.

The multiphase polymer can also include an unsaturated silane monomer such as an unsaturated alkoxy silane. Suitable unsaturated silane monomers include vinyltrimethoxysilane, vinyltriethoxysilane, vinyl tris(2-methoxyethoxy silane), vinyl triisopropoxysilane, (3-methacryloxypropyl)-trimethoxysilane, (3-methacryloxypropyl)-triethoxysilane, (3-methacryloxypropyl)-triisopropoxysilane, 2-methyl-2-propenoic acid 3-[tris-(1-methylethoxy)-silyl]-propyl ester, (3-methacryloxypropyl)-methyldiethoxysilane, oligomers thereof, polymers thereof, or combinations thereof. The unsaturated silane monomer can be present in the soft phase polymer in an amount from 0.01% to 5%, preferably from 0.5% to 5% by weight of the soft phase polymer. The unsaturated silane monomer can be present in the second phase polymer in an amount from 0.01% to 5%, preferably from 0.5% to 5% by weight of the second phase polymer. It is believed including an unsaturated silane monomer improves block resistance of the multiphase polymer. In some embodiments amino alkoxy silanes or epoxy alkoxy silane oligomers thereof can be added to the multiphase polymer. Specific examples include 3-amino propyl trialkoxy silanes, 3-epoxy propyl trialkoxy silane, and the like.

The multiphase polymer also includes one or more (meth) acrylate monomers. In some instances, the multiphase polymer includes at least one methacrylate monomer and at least one acrylate monomer. The methacrylate monomer can be selected from methyl methacrylate, ureido methacrylate, n-butyl methacrylate, isobornyl methacrylate, or a combination thereof. The acrylate monomer can be selected from methyl acylate, ethyl acrylate, n-butyl acrylate, 2-ethylhexyl acrylate, or a combination thereof. In some embodiments, the second phase polymer can include the methacrylate monomer in an amount from 40% to 90% (e.g., from 60% to 90%) by weight, and the acrylate monomer in an amount from 1% to 20% (e.g., from 1% to 10% or from 1% to 5%) by weight, of the second phase polymer. In some embodiments, the soft phase polymer can include the methacrylate monomer in an amount from 5% to 40% (e.g., from 10% to 40% or from 10% to 30%) by weight, and the acrylate monomer in an amount from 40% to 90% (e.g., from 60% to 85%) by weight, of the soft phase polymer. Overall, the one or more (meth)acrylate monomers can be present in an amount from 80% to 97% by weight of the multiphase phase polymer.

The multiphase polymer can include one or more further monomers. The one or more further monomers can include a (meth)acrylonitrile monomer, a (meth)acrylamide monomer, a glycidyl(meth)acylate, a hydroxyalkyl(meth)acrylate such as 2-hydroxyethyl (meth)acrylate or 3-hydroxypropyl (meth)acrylate, or a combination thereof. The one or more further monomers can be present in the first phase, the second phase, and/or the soft phase. For example, one or both of the second phase polymer and the soft phase polymer can include styrene.

In some examples, the second phase polymer and the soft phase polymer in the multiphase polymer can be derived from monomers including from 0.1% to 5% by weight of a multifunctional crosslinking monomer comprising a tri (meth)acrylate monomer, preferably trimethylolpropane triacrylate; from 0.5% to 10% by weight of an unsaturated keto monomer comprising a diacetone acrylamide or an acetoacetoxyalkyl(meth)acrylate such as acetoacetoxyethyl methacrylate; from 0.1% to 5% by weight of an unsaturated silane monomer, preferably an unsaturated alkoxy silane; from 0.1% to 8% or from 0.1% to 5% by weight of ureido (meth)acrylate; and from 80% to 97% by weight of two or more (meth)acrylates comprising at least one methacrylate monomer and at least one acrylate monomer, wherein the percent by weights are based on the total amount of monomers in the second phase polymer and the soft phase polymer. The second phase polymer can further comprise an acid monomer.

In certain embodiments, the second phase polymer can have a Tg of 25° C. or less, preferably from 5° C. to 25° C., more preferably from 5° C. to 15° C. less than that of the first phase polymer. In certain embodiments, the soft phase polymer can have a Tg of 50° C. or greater, preferably from 50° C. to 120° C., more preferably from 70° C. to 110° C. less than that of the second phase polymer. The second phase polymer can be present in an amount of 50% by weight or less, preferably from 10% to 50% by weight, from 15% to 40% by weight, more preferably from 15% to 35% by weight, based on a total weight of the multiphase polymer. The soft phase polymer can be present in an amount of 50% by weight or greater, preferably from 50% to 85% by weight, more preferably from 50% to 70% by weight, most preferably from 60% to 70% by weight, based on the total weight of the multiphase polymer.

As described herein, the multiphase polymer can exhibit a low MFFT, preferably less than the MFFT of an identical polymer without the multifunctional crosslinking monomer in one or both of the second phase polymer and soft phase polymer. In some examples, the multiphase polymer has a MFFT of 40° C. or less. The multiphase polymer can have a volume average particle size diameter of 400 nm or less, preferably from 60 nm to 300 nm, more preferably from 80 nm to 220 nm, even more preferably from 100 nm to 220 nm.

Coating compositions comprising the multiphase polymer are also disclosed herein. The coating compositions can include the multiphase polymer in an amount of from 10% to 90% by weight, preferably from 30% to 80% by weight, of the coating composition. The coating compositions can further comprise a colorant, an inorganic filler, a film forming aid, defoamer, a thickener, a tackifier, or a combination thereof. When present, the inorganic filler can be selected from calcium carbonate, titanium dioxide, clay, kaolin, bentonite, mica, talc, natural silica, synthetic silica, natural silicates, synthetic silicates, feldspars, nepheline syenite, wollastonite, diatomite, barite, glass, attapulgite, zeolite, or mixtures thereof. The inorganic filler can be present in an amount of from greater than 0% to 70%, preferably from 5% to 50%, more preferably from 5% to 30% by weight, of the total weight of the coating composition.

The coating compositions can be a paint, preferably a deep base paint. The colorant can be present in an amount from 2% to 20% by weight of the deep base paint. The colorant can comprise colored pigments, surfactants, pigment dispersing agents and inorganic fillers.

The coating compositions can have a pigment volume concentration (PVC) of 45% or less, preferably 1 to 30%, more preferably 1 to 10% by volume.

Films prepared from the coating compositions comprising the multiphase polymer are also disclosed herein. When applied to a surface as a film, the coating formulated using inventive polymers with the combination of crosslinkers can develop lower tackiness film compared to the coatings formulated with identical polymers but without the crosslinkers within less than 24 hours at room temperature as measured by cotton ball tackiness test. The films exhibit print resistance properties according to ASTM D2064-91; and block resistance properties according to ASTM D4946. The films may also exhibit a print resistance rating of at least 4, preferably from 6 to 10 or from 6 to 8 after curing for 24 hours, according to ASTM D2064-91. The films can exhibit a block resistance rating of at least 5 at 50° C., after curing for 24 hours, according to ASTM D 4946-89. The films exhibit a pendulum hardness of at least 6 or at least 7, as determined by ASTM D4366-16.

Methods of making a multiphase polymer composition are disclosed herein. The method can include a) polymerizing monomers including an ethylenically unsaturated acid monomer, a multifunctional crosslinking monomer, and one or more (meth)acrylates to form a second phase polymer having a Tg of from 40° C. to 240° C., preferably from 60° C. to 240° C., or more preferably from 70° C. to 120° C. by emulsion polymerization, wherein the monomers of step a) are polymerized in the presence of a first phase polymer, and wherein the first phase polymer has a Tg of from 60° C. to 240° C., preferably from 80° C. to 240° C., or more preferably from 80° C. to 150° C. The methods disclosed herein further include step b) polymerizing monomers including one or more multifunctional crosslinking monomer, one or more (meth)acrylates, an unsaturated keto monomer, and an unsaturated alkoxy silane monomer to form a soft phase polymer having a Tg of from −25° C. to 30° C., preferably from −25° C. to 15° C., or more preferably from −15° C. to less than 15° C. by emulsion polymerization, wherein the monomers of step b) are polymerized in the presence of the first and second phase polymers. Step a) optionally further includes polymerizing a keto monomer, an unsaturated alkoxy silane monomer, or combination of these monomers. The methods for making a multiphase polymer composition further include reacting a polyfunctional amine including polyhydrazides with the product formed from step b) and step a) to produce the multiphase polymer. In some instances, the multiphase polymer comprises latex particles having the second phase polymer disposed on a surface of the first phase polymer, preferably wherein the first phase polymer forms an inner phase and the second phase polymer surrounds the inner phase. The soft phase polymer may or may not encapsulate the second phase polymer and may form Acorn or Janus type particles.

The details of one or more embodiments are set forth in the description below. Other features, objects, and advantages will be apparent from the description and from the claims.

DETAILED DESCRIPTION

The compositions and methods described herein may be understood more readily by reference to the following detailed description of specific aspects of the disclosed subject matter and the examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

In this specification and in the claims that follow, reference will be made to a number of terms, which shall be defined to have the following meanings.

Throughout the description and claims of this specification, the words "comprise," "include," and other forms of these words, such as "comprising," "comprises," "including," and "includes" are open, non-limiting terms and do not exclude additional elements such as, for example, additional additives, components, integers, or steps. Although the terms "comprising" and "including" have been used herein to describe various embodiments, the terms "consisting essentially of" and "consisting of" can be used in place of "comprising" and "including" to provide for more specific embodiments and are also disclosed.

As used in the description and the appended claims, the singular forms "a," "an," and "the" include plural referents unless the context clearly dictates otherwise. Thus, for example, reference to "a composition" includes two or more compositions, reference to "an adhesion enhancer" includes two or more adhesion enhancers, reference to "the monomer" includes two or more monomers, and the like.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

As used herein, "(meth)acryl . . . " includes acryl . . . and methacryl . . . and also includes diacryl . . . , dimethacryl . . . and polyacryl . . . and polymethacryl. . . . For example, the term "(meth)acrylate monomer" includes acrylate and methacrylate monomers, diacrylate and dimethacrylate monomers, and other polyacrylate and polymethacrylate monomers.

The term "polymer" includes homopolymers, copolymers, or mixtures thereof.

Multiphase Polymers

Described herein are compositions comprising a multiphase polymer, wherein the multiphase polymer comprises a combination of crosslinking monomers. Coating formulations comprising the multiphase polymer and methods for their preparation and use are also described herein.

As used herein, the term "multiphase" means that the polymer particles include two or more phases. For example, the multiphase polymer particles can include two or more phases, three or more phases, four or more phases, or five or more phases.

The multiphase polymers can comprise (i) a first or hard phase polymer having a Tg of from 60° C. to 240° C. (e.g., from 80° C. to 240° C., or from 80° C. to 150° C.); ii) a second phase polymer having a Tg of from 40° C. to 240° C. (e.g., from 60° C. to 240° C., or from 70° C. to 120° C.) and is derived from monomers including an ethylenically unsaturated acid monomer, a multifunctional crosslinking monomer, one or more (meth)acrylates, and optionally an unsaturated keto monomer, an unsaturated silane monomer, a polyfunctional amine, styrene, or a combination thereof; and iii) a third or soft phase polymer having a Tg of from −25° C. to 30° C. (e.g., from −25° C. to 15° C., or from −15° C. to less than 15° C.) and is derived from monomers including one or more multifunctional crosslinking monomer, one or more (meth)acrylates, an unsaturated keto monomer, an unsaturated silane monomer, and a polyfunctional amine.

As used herein, the term "theoretical glass transition temperature" or "theoretical Tg" refers to the estimated Tg of a polymer or copolymer calculated using the Fox equation. The Fox equation can be used to estimate the glass transition temperature of a polymer or copolymer as described, for example, in L. H. Sperling, "Introduction to Physical Polymer Science", 2nd Edition, John Wiley & Sons, New York, p. 357 (1992) and T. G. Fox, *Bull. Am. Phys. Soc,* 1, 123 (1956), both of which are incorporated herein by reference. For example, the theoretical glass transition temperature of a copolymer derived from monomers a, b, . . . , and i can be calculated according to the equation below $$\frac{1}{T_g} = \frac{w_a}{T_{ga}} + \frac{w_b}{T_{gb}} + \dots + \frac{w_i}{T_{gi}}$$

where $w_a$ is the weight fraction of monomer a in the copolymer, $T_{ga}$ is the glass transition temperature of a homopolymer of monomer a, $w_b$ is the weight fraction of monomer b in the copolymer, $T_{gb}$ is the glass transition temperature of a homopolymer of monomer b, $w_i$ is the weight fraction of monomer i in the copolymer, $T_{gi}$ is the glass transition temperature of a homopolymer of monomer i, and $T_g$ is the theoretical glass transition temperature of the copolymer derived from monomers a, b, . . . , and i. Theoretical Tgs are calculated excluding the multifunctional unsaturated monomer, unsaturated keto monomer and unsaturated silane monomer.

In some embodiments, the theoretical $T_g$ of the first phase polymer can be at least 60° C. (e.g., at least 65° C., at least 70° C., at least 75° C., at least 80° C., at least 85° C., at least 90° C., at least 95° C., at least 100° C., at least 105° C., at least 110° C., at least 120° C., at least 125° C., at least 130° C., at least 140° C., at least 150° C., at least 160° C., at least 170° C., at least 180° C., at least 190° C., at least 200° C., at least 210° C., at least 220° C., at least 230° C., or at least 240° C.). In some embodiments, the theoretical $T_g$ of the first phase polymer $T_g$ can be 240° C. or less (e.g., 230° C. or less, 220° C. or less, 210° C. or less, 200° C. or less, 190° C. or less, 180° C. or less, 170° C. or less, 160° C. or less, 150° C. or less, 140° C. or less, 130° C. or less, 120° C. or less, 115° C. or less, 110° C. or less, 105° C. or less, 100° C. or less, 95° C. or less, 90° C. or less, 85° C. or less, 80° C. or less, 75° C. or less, 70° C. or less, 65° C. or less, or 60° C. or less). The theoretical $T_g$ of the first phase polymer can range from any of the minimum values described above to any of the maximum values described above. For example, the second theoretical $T_g$ of the first phase polymer can range from 60° C. to 240° C. (e.g., from 60° C. to 215° C., from 60° C. to 200° C., from 60° C. to less than 180° C., from 60° C. to 150° C., from 70° C. to 215° C., from 70° C. to 200° C., from 70° C. to less than 180° C., from 70° C. to 150° C., from 80° C. to 240° C., from 80° C. to 210° C., from 80° C. to less than 200° C., from 80° C. to 180° C., from 80° C. to 150° C., from 90° C. to 160° C., or from 90° C. to 130° C.).

In some embodiments, the theoretical $T_g$ of the second phase polymer can be at least 40° C. (e.g., at least 45° C., at least 50° C., at least 55° C., at least 60° C., at least 65° C., at least 70° C., at least 75° C., at least 80° C., at least 85° C., at least 90° C., at least 95° C., at least 100° C., at least 105° C., at least 110° C., at least 120° C., at least 125° C., at least 130° C., at least 140° C., at least 150° C., at least 160° C., at least 170° C., at least 180° C., at least 190° C., at least 200° C., at least 210° C., at least 220° C., at least 230° C., or at least 240° C.). In some embodiments, the theoretical $T_g$ of the second phase polymer can be 240° C. or less (e.g., 230° C. or less, 220° C. or less, 210° C. or less, 200° C. or less, 190° C. or less, 180° C. or less, 170° C. or less, 160° C. or less, 150° C. or less, 140° C. or less, 130° C. or less, 120° C. or less, 115° C. or less, 110° C. or less, 105° C. or less, 100° C. or less, 95° C. or less, 90° C. or less, 85° C. or less, 80° C. or less, 75° C. or less, 70° C. or less, 65° C. or less, 60° C. or less, 55° C. or less, 50° C. or less, 45° C. or less, or 40° C. or less). The theoretical $T_g$ of the second phase polymer can range from any of the minimum values described above to any of the maximum values described above. For example, the theoretical $T_g$ of the second phase polymer can range from 40° C. to 240° C. (e.g., from 60° C. to 240° C., from 60° C. to 120° C., from 40° C. to 120° C., from 60° C. to 100° C., from 40° C. to 100° C., from 80° C. to 110° C., or from 70° C. to 100° C.).

In some embodiments, the theoretical $T_g$ of the soft phase polymer can be 30° C. or less (e.g., 25° C. or less, 20° C. or less, 15° C. or less, 10° C. or less, 5° C. or less, 0° C. or less, −5° C. or less, −10° C. or less, −15° C. or less, −20° C. or less, or −25° C. or less,). In some embodiments, the theoretical $T_g$ of the soft phase polymer can be at least −25° C., at least −20° C., at least −15° C., at least −10° C., at least −5° C., at least −0° C., at least 5° C., at least 10° C., at least 15° C., at least 20° C., or at least 25° C.). The theoretical $T_g$ of the soft phase polymer can range from any of the minimum values described above to any of the maximum values described above. For example, the theoretical $T_g$ of the soft phase polymer can range from −25° C. to 30° C. (e.g., from −25° C. to 25° C., from −25° C. to 10° C., from −25° C. to 0° C., from −20° C. to 30° C., from −10° C. to 30° C., from −10° C. to 25° C., or from −0° C. to 20° C.).

The theoretical $T_g$ of the second phase polymer is greater than the theoretical $T_g$ of the soft phase polymer. In some embodiments, the theoretical $T_g$ of the second phase polymer can be at least 20° C. greater than the theoretical $T_g$ of the soft phase polymer (e.g., at least 25° C. greater, at least 30° C. greater, at least 35° C. greater, at least 40° C. greater, at least 45° C. greater, at least 50° C. greater, at least 55° C. greater, at least 60° C. greater, at least 65° C. greater, at least 70° C. greater, at least 75° C. greater, at least 80° C. greater, at least 85° C. greater, at least 90° C. greater, at least 95° C. greater, at least 100° C. greater, at least 105° C. greater, at least 110° C. greater, at least 115° C. greater, or at least 120° C. greater).

In some examples, the multiphase polymer can be in the form of multilayer particles that comprise (i) a first layer comprising the first phase polymer; and (ii) a second layer surrounding at least a portion of the first layer comprising the second phase polymer. The multilayer particles can include a first layer and a second layer surrounding at least a portion of the first layer. For example, the multilayer particles can range from core-shell particles to so-called "acorn" particles, wherein the second layer surrounds a substantial portion of the first layer either in a continuous, semi-continuous or discontinuous fashion (e.g., such that the second layer forms at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the particle surface). In some embodiments, the first layer and the second layer form first and second domains within the multilayer particle, wherein the second layer surrounds at least a portion of the first layer. The third soft phase polymer can be separate from the particles comprising the first polymer and the second polymer. In some embodiments, at least a portion of the third polymer forms a shell over the second polymer resulting in an acorn like morphology. In some embodiments, at least a portion of the third polymer forms a shell over the first polymer. In some embodiments, at least a portion of the third polymer forms a particle that does not include the first polymer or the second polymer. In some embodiments, the multiphase polymer particle has multiple domains of different phases.

The weight ratio of the first phase polymer (or first polymer) to the second phase polymer can be 1:30 or greater (e.g., 1:25 or greater, 1:20 or greater, 1:18 or greater, 1:15 or greater, 1:12 or greater, 1:10 or greater 1:9.5 or greater, 1:9 or greater, 1:8.5 or greater, 1:8 or greater, 1:7.5 or greater, 1:7 or greater, 1:6.5 or greater, 1:6 or greater, 1:5.5 or greater, 1:5 or greater, 1:4.5 or greater, 1:4 or greater, 1:3.5 or greater, or 1:3 or greater). The weight ratio of the first phase polymer (or first polymer) to the second phase polymer can be 1:3 or less (e.g., at least 1:3.5 or less, 1:4 or less, 1:4.5 or less, 1:5 or less, 1:5.5 or less, 1:6 or less, 1:6.5 or less, 1:7 or less, 1:7.5 or less, 1:8 or less, 1:8.5 or less, 1:9 or less, 1:9.5 or less, 1:10 or less, 1:12 or less, 1:15 or less, 1:18 or less, 1:20 or less, 1:22 or less, 1:25 or less, 1:28 or less, or 1:30 or less). The weight ratio of the first phase polymer (or first polymer) to the second phase polymer can range from any of the minimum ratios described above to any of the maximum values described above. For example, the weight ratio of the first phase polymer (or first polymer) to the second phase polymer can be from 1:30 to 1:3 (e.g., from 1:30 to 1:5, or from 1:10 to 1:5).

The weight ratio of the second phase polymer to the soft phase polymer (or third polymer) can be 1:5 or greater (e.g., 1:4.5 or greater, 1:4 or greater, 1:3.5 or greater, 1:3 or greater, 1:2.5 or greater, 1:2 or greater 1:1.5 or greater, or 1:1 or greater). The weight ratio of the second phase polymer to the soft phase polymer (or third polymer) can be 1:1 or less (e.g., at least 1:1.5 or less, 1:2 or less, 1:2.5 or less, 1:3 or less, 1:3.5 or less, 1:4 or less, 1:4.5 or less, 1:5 or less, or 1:5.5 or less). The weight ratio of the second phase polymer to the soft phase polymer (or third polymer) can range from any of the minimum ratios described above to any of the maximum values described above. For example, the weight ratio of the second phase polymer to the soft phase polymer (or third polymer) can be from 1:5 to 1:1 (e.g., from 1:5 to 1:1.5, or from 1:4 to 1:2).

The multiphase polymer can, for example, be derived from greater than 0% by weight of the first phase polymer, based on the total weight of the multiphase polymer (e.g., 0.1% or more, 0.25% or more, 0.5% or more, 0.75% or more, 1% or more, 1.5% or more, 2% or more, 2.5% or more, 3% or more, 3.5% or more, 4% or more, 4.5% or more, 5% or more, 6% or more, 7% or more, or 8% or more). In some examples, the multiphase polymer can be derived from 15% or less by weight of the first phase polymer, based on the total weight of the multiphase polymer (e.g., 12% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, 1% or less, 0.75% or less, or 0.5% or less by weight). The amount of first phase polymer the multiphase polymer is derived from can range from any of the minimum values described above to any of the maximum values described above. For example, the multiphase polymer can be derived from greater than 0% to 15% by weight first phase polymer, based on the total weight of the multiphase polymer (e.g., from greater than 0% to 10%, from 0.1% to 10%, from 1% to 10%, from 1% to 8%, from 1.5% to 10%, from 1.5% to 6%, or from 1.5% to 5% by weight).

The multiphase polymer can, for example, be derived from greater than 15% by weight of the second phase polymer, based on the total weight of the multiphase polymer (e.g., 18% or more, 20% or more, 22% or more, 25% or more, 28% or more, 30% or more, 32% or more, 35% or more, 37% or more, 40% or more, 42% or more, 45% or more, or 50% by weight or more). In some examples, the multiphase polymer can be derived from 50% or less by weight of the second phase polymer, based on the total weight of the multiphase polymer (e.g., 48% or less, 45% or less, 40% or less, 38% or less, 36% or less, 35% or less, 34% or less, 32% or less, 30% or less, 28% or less, 25% or less, 26% or less, 24% or less, 22% or less, 20% or less, 18% or less, or 15% or less). The amount of second phase polymer the multiphase polymer is derived from can range from any of the minimum values described above to any of the maximum values described above. For example, the multiphase polymer can be derived from greater than 15% to 50% by weight second phase polymer, based on the total weight of the multiphase polymer (e.g., from greater than 15% to 50%, from 20% to 45%, from 20% to 40%, from 25% to 40%, or from 25% to 35%).

The multiphase polymer can, for example, be derived from 40% or greater by weight of the soft phase polymer, based on the total weight of the multiphase polymer (e.g., 45% or more, 47% or more, 50% or more, 52% or more, 55% or more, 58% or more, 60% or more, 62% or more, 64% or more, 65% or more, 68% or more, 70% or more, or 75% or more). In some examples, the multiphase polymer can be derived from 80% or less by weight of the soft phase polymer, based on the total weight of the multiphase polymer (e.g., 75% or less, 72% or less, 70% or less, 68% or less, 66% or less, 65% or less, 64% or less, 62% or less, 60% or less, 58% or less, 55% or less, 52% or less, 50% or less, 48% or less, 46% or less, 45% or less, or 40% or less). The amount of soft phase polymer the multiphase polymer is derived from can range from any of the minimum values described above to any of the maximum values described above. For example, the multiphase polymer can be derived from greater than 45% to 80% by weight soft phase polymer, based on the total weight of the multiphase polymer (e.g., from greater than 45% to 75%, from 50% to 75%, from 50% to 70%, from 55% to 70%, or from 55% to 65%).

First Phase Polymer

The first phase polymer can be a homopolymer derived from a single ethylenically-unsaturated monomer or a copolymer derived from ethylenically-unsaturated monomers. In some embodiments, the first phase polymer includes an acrylic-based polymer. Acrylic-based polymers include polymers derived from one or more (meth)acrylate monomers. The acrylic-based polymer can be a pure acrylic polymer (i.e., a polymer derived exclusively from (meth) acrylate monomers), a styrene-acrylic polymer (i.e., a copolymer derived from styrene and one or more (meth)acrylate monomers), or a vinyl-acrylic polymer (i.e., a copolymer derived from one or more vinyl ester monomers and one or more (meth)acrylate monomers) . . . . In some embodiments, the first phase polymer includes a vinyl aromatic based polymer such as a pure vinyl aromatic based polymer (i.e., a polymer derived exclusively from vinyl aromatic monomers such as styrene).

The first phase polymer can be derived from one or more hard ethylenically-unsaturated monomers. As used herein, the term "hard ethylenically-unsaturated monomer" refers to an ethylenically-unsaturated monomer that, when homopolymerized, forms a polymer having a $T_g$, as measured using DSC, of greater than 0° C. Hard ethylenically-unsaturated monomers are known in the art, and include, for example, methyl acrylate ($T_g$=10° C.), methyl methacrylate ($T_g$=120° C.), ethyl methacrylate ($T_g$=65° C.), n-butyl methacrylate ($T_g$=20° C.), tert-butyl methacrylate ($T_g$=118° C.), tert-butyl acrylate ($T_g$=44° C.), isobutyl methacrylate ($T_g$=53° C.), vinyl acetate ($T_g$=30° C.), hydroxyethyl acrylate ($T_g$=15° C.), hydroxyethyl methacrylate ($T_g$=57° C.), cyclohexyl acrylate ($T_g$=19° C.), cyclohexyl methacrylate ($T_g$=92° C.), 2-ethoxyethyl methacrylate ($T_g$=16° C.), 2-phenoxyethyl methacrylate ($T_g$=54° C.), benzyl acrylate ($T_g$=6° C.), benzyl methacrylate ($T_g$=54° C.), hydroxypropyl methacrylate ($T_g$=76° C.), styrene ($T_g$=100° C.), 4-acetostyrene ($T_g$=116° C.), acrylamide ($T_g$=165° C.), acrylonitrile ($T_g$=125° C.), 4-bromostyrene ($T_g$=118° C.), n-tert-butylacrylamide ($T_g$=128° C.), 4-tert-butylstyrene ($T_g$=127° C.), 2,4-dimethylstyrene ($T_g$=112° C.), 2,5-dimethylstyrene ($T_g$=143° C.), 3,5-dimethylstyrene ($T_g$=104° C.), isobornyl acrylate ($T_g$=94° C.), isobornyl methacrylate ($T_g$=110° C.), 4-methoxystyrene ($T_g$=113° C.), methylstyrene ($T_g$=20° C.), 4-methylstyrene ($T_g$=97° C.), 3-methylstyrene ($T_g$=97° C.), 2,4,6-trimethylstyrene ($T_g$=162° C.), and combinations thereof.

In some embodiments, the first phase polymer can be derived from one or more hard ethylenically-unsaturated monomers that, when homopolymerized, form a polymer having a theoretical $T_g$, of at least 60° C. (e.g., at least 80° C., at least 85° C., at least 90° C., at least 95° C., at least 100° C., at least 105° C., at least 110° C., at least 115° C., or at least 120° C.). In some embodiments, the first phase polymer can be derived from greater than 50% by weight or greater of one or more hard ethylenically-unsaturated monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the hard ethylenically-unsaturated monomer) based on the total weight of monomers used to form the first phase polymer.

In some embodiments, the first phase polymer can be derived from one or more hard ethylenically-unsaturated monomers selected from the group consisting of methyl methacrylate, styrene, and combinations thereof. In certain embodiments, the first phase polymer is derived from at least 90% by weight (e.g., at least 90% by weight, at least 91% by weight, at least 92% by weight, at least 93% by weight, at least 94% by weight, at least 95% by weight, at least 96% by weight, at least 97% by weight, at least 98% by weight, or at least 99% by weight) of one or more hard ethylenically-unsaturated monomers selected from the group consisting of methyl methacrylate, styrene, and combinations thereof, based on the total weight of monomers used to form the first phase polymer. In some examples, the first phase polymer can comprise greater than 0% by weight styrene, preferably from 10% to 100% by weight styrene, or more preferably from 40% to 100% by weight styrene, based on a total weight of the first phase polymer. In certain embodiments, the first phase polymer is derived from at least 85% by weight (e.g., at least 86% by weight, at least 87% by weight, at least 88% by weight, at least 89% by weight, at least 90% by weight, at least 91% by weight, at least 92% by weight, at least 93% by weight, at least 94% by weight, at least 95% by weight, at least 96% by weight, at least 97% by weight, at least 98% by weight, or at least 99% by weight) styrene, based on the total weight of monomers used to form the first phase polymer. The first phase polymer may be a seed polymer such as a polystyrene seed.

The first phase polymer can be derived from one or more additional ethylenically-unsaturated monomers (e.g., (meth) acrylate monomers, carboxylic acid-containing monomers, acetoacetoxy monomers, phosphorus-containing monomers, etc.), in addition to one or more hard ethylenically-unsaturated monomers. In certain embodiments, the first phase polymer is substantially free (i.e., is derived from less than 0.25% by weight) of acetoacetoxy monomers and/or phosphorus-containing monomers. In certain embodiments, the first phase polymer is substantially free (i.e., is derived from less than 0.25% by weight) of carboxylic acid-containing monomers.

Generally, the mean volume average particle size of the first phase polymer is about 60 nm or less, such as 50 nm or less, or 40 nm or less. For example, the first phase polymer can have a mean volume average particle size of from about 10 nm to about 60 nm, such as from about 20 nm to about 50 nm, or about 20 nm to about 40 nm.

Second Phase Polymer

The second phase polymer can be derived from ethylenically-unsaturated monomers and one or more crosslinking monomers. Exemplary ethylenically-unsaturated monomers include (meth)acrylate monomers, vinyl aromatic monomers (e.g., styrene), ethylenically unsaturated aliphatic monomers (e.g., butadiene), vinyl ester monomers (e.g., vinyl acetate), and combinations thereof.

In some embodiments, the second phase polymer can include an acrylic-based copolymer. Acrylic-based copolymers include copolymers derived from one or more (meth) acrylate monomers. The term "(meth)acrylate monomer" as used herein includes acrylate, methacrylate, diacrylate, and dimethacrylate monomers. The (meth)acrylate monomer can include esters of α,β-monoethylenically unsaturated monocarboxylic and dicarboxylic acids having 3 to 6 carbon atoms with alkanols having 1 to 20 carbon atoms (e.g., esters of acrylic acid, methacrylic acid, maleic acid, fumaric acid, or itaconic acid, with $C_1$-$C_{20}$, $C_4$-$C_{20}$, $C_1$-$C_{16}$, or $C_4$-$C_{16}$ alkanols). The acrylic-based copolymer can be a pure acrylic polymer (i.e., a copolymer derived primarily from (meth) acrylate monomers), a styrene-acrylic polymer (i.e., a copolymer derived from styrene and one or more (meth)acrylate monomers), or a vinyl-acrylic polymer (i.e., a copolymer derived from one or more vinyl ester monomers and one or more (meth)acrylate monomers).

The second phase polymer can be derived from one or more hard ethylenically-unsaturated monomers. In some embodiments, the second phase polymer can be derived from one or more hard ethylenically-unsaturated monomers including, but not limited to, methyl acrylate, ureido methacrylate, isobornyl methacrylate, methyl methacrylate, ethyl methacrylate, n-butyl methacrylate, tert-butyl methacrylate, t-butyl acrylate, isobutyl methacrylate, vinyl acetate, hydroxyethyl acrylate, hydroxyethyl methacrylate, cyclohexyl acrylate, cyclohexyl methacrylate, 2-ethoxyethyl methacrylate, 2-phenoxyethyl methacrylate, benzyl acrylate, benzyl methacrylate, hydroxypropyl methacrylate, styrene, 4-acetostyrene, acrylamide, acrylonitrile, 4-bromostyrene, n-tert-butylacrylamide, 4-tert-butylstyrene, 2,4-dimethylstyrene, 2,5-dimethylstyrene, 3,5-dimethylstyrene, isobornyl acrylate, isobornyl methacrylate, 4-methoxystyrene, methylstyrene, 4-methylstyrene, or a combination thereof. In certain embodiments, the second phase polymer can be derived from a hard ethylenically-unsaturated monomer selected from the group consisting of methyl acrylate, methyl methacrylate, ureido methacrylate, n-butyl methacrylate, isobornyl methacrylate, and combinations thereof.

The second phase polymer can be derived from at least 10% by weight of one or more hard ethylenically-unsaturated monomers, based on the total weight of the monomers used to form the second phase polymer (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, at least 90% by weight, at least 95% by weight, or at least 98% by weight). The second phase polymer can be derived from at most 98% by weight of one or more hard ethylenically-unsaturated monomers, based on the total weight of the monomers used to form the second phase polymer (e.g., at most 97% by weight, at most 95% by weight, at most 90% by weight, at most 85% by weight, at most 80% by weight, at most 75% by weight, at most 70% by weight, at most 65% by weight, at most 60% by weight, at most 55% by weight, at most 50% by weight, at most 45% by weight, at most 40% by weight, at most 35% by weight, at most 30% by weight, at most 25% by weight, at most 20% by weight, or at most 15% by weight). The second phase polymer can be derived from an amount of one or more hard ethylenically-unsaturated monomers ranging from any of the minimum percentages described above to any of the maximum percentages described above. For example, the second phase polymer can be derived from 15% to 99% by weight of one or more hard ethylenically-unsaturated monomers, based on the total weight of the monomers used to form the second phase polymer (e.g., from 50% to 99% by weight, from 50% to 95% by weight, from 15% to 90% by weight, from 25% to 90% by weight, from 30% to 95% by weight, or from 35% to 95% by weight).

The second phase polymer can be derived from one or more soft ethylenically-unsaturated monomers. As used herein, the term "soft ethylenically-unsaturated monomer" refers to an ethylenically-unsaturated monomer that, when homopolymerized, forms a polymer having a glass transition temperature, as measured using differential scanning calorimetry (DSC), of 0° C. or less. Soft ethylenically-unsaturated monomers are known in the art, and include, for example, ethyl acrylate ($T_g$=−24° C.), butyl acrylate (n-butyl acrylate, $T_g$=−54° C.), sec-butyl acrylate ($T_g$=−26° C.), sec-butyl acrylate ($T_g$=−26° C.), isobutyl acrylate ($T_g$=−24° C.), n-hexyl acrylate ($T_g$=−45° C.), n-hexyl methacrylate ($T_g$=−5° C.), 2-ethylhexyl acrylate ($T_g$=−85° C.), 2-ethylhexyl methacrylate ($T_g$=−10° C.), octyl methacrylate ($T_g$=−20° C.), n-decyl methacrylate ($T_g$=−30° C.), isodecyl acrylate ($T_g$=−55° C.), dodecyl acrylate ($T_g$=−3° C.), dodecyl methacrylate ($T_g$=−65° C.), 2-ethoxyethyl acrylate ($T_g$=−50° C.), 2-methoxy acrylate ($T_g$=−50° C.), and 2-(2-ethoxyethoxy)ethyl acrylate ($T_g$=−70° C.).

In some embodiments, the second phase polymer can be derived from a soft ethylenically-unsaturated monomer that, when homopolymerized, forms a polymer having a glass transition temperature, as measured using DSC, of 10° C. or less (e.g., 0° C. or less, −10° C. or less, −20° C. or less, −30° C. or less, −40° C. or less, −50° C. or less, −60° C. or less, −70° C. or less, or −80° C. or less). In certain embodiments, the soft ethylenically-unsaturated monomer can be a (meth) acrylate monomer. In certain embodiments, the second phase polymer can be derived from a soft ethylenically-unsaturated monomer selected from the group consisting of butyl acrylate, 2-ethylhexyl acrylate, and combinations thereof.

The second phase polymer can be derived from at least 0.5% by weight of one or more soft ethylenically-unsaturated monomers, based on the total weight of the monomers used to form the second phase polymer (e.g., at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, at least 6% by weight, at least 6.5% by weight, at least 7% by weight, at least 7.5% by weight, at least 8% by weight, at least 8.5% by weight, at least 9% by weight, at least 9.5% by weight, at least 10% by weight, at least 12% by weight, at least 14% by weight, at least 15% by weight, at least 18% by weight, at least 20% by weight, at least 22% by weight, at least 24% by weight, or at least 25% by weight). The second phase polymer can be derived from at most 25% by weight of one or more soft ethylenically-unsaturated monomers, based on the total weight of the monomers used to form the second phase polymer (e.g., at most 22% by weight, at most 20% by weight, at most 18% by weight, at most 15% by weight, at most 12% by weight, at most 10% by weight, at most 9% by weight, at most 8% by weight, at most 7% by weight, at most 6% by weight, at most 5% by weight, at most 4.5% by weight, at most 4% by weight, or at most 3% by weight). The second phase polymer can be derived from an amount of one or more soft ethylenically-unsaturated monomers ranging from any of the minimum percentages described above to any of the maximum percentages described above. For example, the second phase polymer can be derived from 0.5% to 25% by weight of one or more soft ethylenically-unsaturated monomers, based on the total weight of the monomers used to form the second phase polymer (e.g., from 0.5% to 20% by weight, from 2% to 20% by weight, from 2% to 10% by weight, or from 2.5% to 8% by weight).

The second phase polymer can include an ethylenically unsaturated acid monomer. Suitable ethylenically unsaturated strong acid monomers include any monomers that have a pendant acid group with a pKa (in water at 20° C.) of less than 4 or salts of such monomers. Suitable salts of acid monomers include ammonium, sodium, potassium and lithium salts. The ethylenically unsaturated acid monomer can be selected from a carboxylic acid monomer, a phosphorous acid monomer, a sulfur acid monomer, or a mixture thereof.

In some embodiments, the second phase polymer can be derived from one or more carboxylic acid-containing monomers. Suitable carboxylic acid-containing monomers are known in the art, and include $\alpha,\beta$-monoethylenically unsaturated mono- and dicarboxylic acids, such as acrylic acid, methacrylic acid, itaconic acid, crotonic acid, maleic acid, fumaric acid, dimethacrylic acid, ethylacrylic acid, allylacetic acid, vinylacetic acid, mesaconic acid, methylenemalonic acid, citraconic acid, and combinations thereof.

In some embodiments, the second phase polymer can be derived from one or more phosphorous acid monomers. Suitable phosphorous acid monomers are known in the art, and include phosphoalkyl acrylates or phosphoalkyl methacrylates such as phosphoethyl acrylate or phosphoethyl methacrylate, phosphopropyl acrylate or phosphopropyl methacrylate, phosphobutyl acrylate or phosphobutyl methacrylate, phosphate ester of polyethyleneglycol acrylate or polyethyleneglycol methacrylate and phosphate ester of polypropyleneglycol acrylate or polypropyleneglycol methacrylate; phosphoalkyl crotonates; phosphoalkyl maleates; phosphoalkyl fumarates; phosphodialkyl acrylates or phosphodialkyl methacrylates; phosphodialkyl crotonates; allyl phosphate; vinyl phosphonic acid; allyl phosphonic acid; 2-acrylamido-2-methylpropanephosphonic acid; a-phosphonostyrene; 2-methylacrylamido-2-methylpropane phosphonic acid; 2-phosphoethyl(meth)acrylate; 2-phosphopropyl (meth)acrylate; 3-phosphopropyl(meth)acrylate; 3-phospho-2-hydroxypropyl(meth)acrylate; a mixture thereof, or a salt thereof, or combinations thereof. In some embodiments, the phosphorous acid monomer can have a formula $CH_2{=}C(R){-}C(O){-}O{-}(R^1O)_n{-}P(O)(OH)_2$, where R is H or $CH_3$, $R^1$ is alkyl, and n is from 0 to 50. In some embodiments, the phosphorous acid monomer can be a monomer sold under the trade name Sipomer® PAM 100, Sipomer® PAM 200, or Sipomer® PAM 4000.

In some embodiments, the second phase polymer can be derived from one or more sulfur acid monomers. Suitable sulfur acid monomers are known in the art, and include 2-acrylamido-2-methyl propane sulfonic acid; styrene sulfonic acid; 1-allyloxy-2-hydroxypropane sulfonic acid; vinylsulfonic acid; alkyl allyl sulfosuccinic acid; sulfoethyl acrylate, sulfoethyl methacrylate; salts thereof; or combinations thereof.

The second phase polymer can be derived from greater than 0% by weight of one or more ethylenically unsaturated acid monomers, based on the total weight of the monomers used to form the second phase polymer (e.g., at least 0.01% by weight, at least 0.05% by weight, at least 0.1% by weight, at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, or at least 6% by weight). The second phase polymer can be derived from 6% or less by weight of one or more ethylenically unsaturated acid monomers, based on the total weight of the monomers used to form the second phase polymer (e.g., from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight). The second phase polymer can be derived from an amount of one or more ethylenically unsaturated acid monomers ranging from any of the minimum percentages described above to any of the maximum percentages described above. For example, the second phase polymer can be derived from greater than 0% by weight to 6% by weight of one or more ethylenically unsaturated acid monomers, based on the total weight of the monomers used to form the second phase polymer (e.g., from 0.01% by weight to 6% by weight, from 0.5% by weight to 5% by weight, or from 0.5% by weight to 3% by weight of one or more ethylenically unsaturated acid monomers).

The second phase polymer disclosed herein can also be derived from a multifunctional crosslinking agent. By the general term "crosslinking" agent or "crosslinking" monomers it is meant an ethylenically unsaturated monomer through which a crosslink is or will be derived. The term "multifunctional" crosslinking monomer as used herein refers to a crosslinking monomer having two or more (e.g., three or more, four or more, or five or more) reactive functional groups such as two or more polymerizable unsaturated groups in one molecule. In some embodiments, the multifunctional crosslinking monomer can include two or more polymerizable carbon-carbon double bonds. Exemplary multifunctional crosslinking agents include, but are not limited to, a divinyl monomer, a diallyl monomer, a trivinyl monomer, a triallyl monomer, a di(meth)acrylate, a tri(meth)acrylate, tetra(meth)acrylate, penta(meth)acrylate), or a combination thereof.

Multifunctional crosslinking monomers also include divinyl(meth)acrylate, diallyl(meth)acrylate, allyl(meth)acrylate, trivinyl(meth)acrylate, triallyl(meth)acrylate, divinyl benzene, trivinylbenzene, diallyl maleate, or a combination thereof.

In some examples, the multifunctional crosslinking monomer comprises a tri(meth)acrylate, preferably trimethylolpropane triacrylate. Without wishing to be bound by theory, it is believed including trimethylol propane triacrylate in both the second phase polymer and the soft phase polymer increases phase separation between the second phase and soft phase polymers, which consequently decreases the minimum film forming temperature of the multiphase polymer.

The amount of multifunctional crosslinking agent can be 0.01% or more based on the total amount of the monomers in the second phase polymer (e.g., 0.05% or more, 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, 1.8% or more, 1.9% or more, 2% or more, 2.5% or more, 3% or more, 3.5% or more, or 4% or more). In some examples, the amount of multifunctional crosslinking agent can be 5% or less based on the total amount of the monomers in the second phase polymer (e.g., 4.5% or less, 4% or less, 3.5% or less, 3% or less, 2.5% or less, 2% or less, 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.4% or less, 0.3% or less, or 0.2% or less). The amount of multifunctional crosslinking agent employed can range from any of the minimum values described above to any of the maximum values described above. For example, the amount of multifunctional crosslinking agent can be from 0.05% to 5% based on the total amount of monomers in the second phase polymer (e.g., from 0.2% to 5%, from 0.5% to 5%, from 0.05% to 2.5%, from 2.5% to 2%, from 0.05% to 0.5%, from 0.5% to 1%, from 1% to 1.5%, from 1.5% to 2%, from 2% to 2.5%, from 2.5% to 3%, from 3% to 3.5%, from 3.5% to 4%, from 4% to 4.5%, from 4.5% to 5%, from 0.05% to 4%, from 0.05% to 3%, or from 0.05% to 2%).

The second phase polymer also includes an unsaturated keto monomer. The unsaturated keto monomer can be selected from diacetone acrylamide, an acetoacetoxyalkyl (meth)acrylate, or a combination thereof. Suitable acetoacetoxy monomers are known in the art, and include acetoacetoxyalkyl (meth)acrylates, such as acetoacetoxyethyl (meth)acrylate (AAEM), acetoacetoxypropyl(meth)acrylate, acetoacetoxybutyl(meth)acrylate, and 2,3-di(acetoacetoxy) propyl(meth)acrylate; allyl acetoacetate; vinyl acetoacetate; and combinations thereof.

The second phase polymer can be derived from greater than 0% by weight of the unsaturated keto monomers, based on the total weight of the monomers used to form the second phase polymer (e.g., at least 0.01% by weight, at least 0.05% by weight, at least 0.1% by weight, at least 0.2% by weight, at least 0.3% by weight, at least 0.4% by weight, at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, at least 6% by weight, at least 6.5% by weight, at least 7% by weight, at least 7.5% by weight, at least 8% by weight, at least 8.5% by weight, at least 9% by weight, at least 10% by weight, at least 11% by weight, at least 12% by weight, at least 13% by weight, at least 14% by weight, or at least 15% by weight). The second phase polymer can be derived from 15% or less by weight of one or more unsaturated keto monomers, based on the total weight of the monomers used to form the second phase polymer (e.g., 14% or less by weight, 13% or less by weight, 12% or less by weight, 11% or less by weight, 10% or less by weight, 9.5% or less by weight, from 8% or less by weight, from 8.5% or less by weight, from 8% or less by weight, from 7.5% or less by weight, from 7% or less by weight, from 6.5% or less by weight, from 6% or less by weight, from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight). The second phase polymer can be derived from an amount of one or more unsaturated keto monomers ranging from any of the minimum percentages described above to any of the maximum percentages described above. For example, the second phase polymer can be derived from greater than 0% by weight to 15% by weight of one or more unsaturated keto monomers, based on the total weight of the monomers used to form the second phase polymer (e.g., from 0.01% by weight to 10% by weight of one or more unsaturated keto monomers, from 0.5% by weight to 10% by weight of one or more unsaturated keto monomers, from 1% by weight to 10% by weight of one or more unsaturated keto monomers, from 0.01% by weight to 5% by weight of one or more unsaturated keto monomers, from 0.5% by weight to 5% by weight of one or more unsaturated keto monomers, or from 0.1% by weight to 3.5% by weight of one or more unsaturated keto monomers).

The second phase polymer can include an alkoxy silane crosslinker monomer, preferably an unsaturated alkoxy silane monomer. In some embodiments the unsaturated alkoxy silane monomer can be represented by the formula $$(R^1)-Si-(OR^2)_3 \quad \text{Formula I}$$

wherein $R^1$ is a vinyl containing group, a (meth)acryl group; and $R^2$ for each occurrence, is independently selected from a $C_1$-$C_{10}$ alkyl group.

In some embodiments, the unsaturated alkoxy silane monomer can be represented by the formula $$(R^1)-Si-(OR^2)_1(R^2)_2 \quad \text{Formula II}$$

or $$(R^1)-Si-(OR^2)_2(R^2)_1 \quad \text{Formula III}$$

wherein $R^1$ is a vinyl containing group, a (meth)acryl group; and $R^2$ for each occurrence, is independently selected from a $C_1$-$C_{10}$ alkyl group.

In some examples, the unsaturated alkoxy silane comprises a vinyl silane. Exemplary unsaturated alkoxy silanes can include vinyltrimethoxysilane, vinyltriethoxysilane, vinyl tris(2-methoxyethoxysilane), vinyl triisopropoxysilane, (meth)acryloyloxypropyl trimethoxysilane, γ-(meth)acryloxypropyl trimethoxysilane, γ-(meth)acryloxypropyl triethoxysilane, (3-methacryloxypropyl)-trimethoxysilane, (3-methacryloxypropyl)-triethoxysilane, (3-methacryloxypropyl)-triisopropoxysilane, 2-methyl-2-propenoic acid 3-[tris-(1-methylethoxy)-silyl]-propyl ester, (3-methacryloxypropyl)-methyldiethoxysilane, 3-glycidoxypropyl methyldiethoxysilane, 3-glycidoxypropyl methyldimethoxysilane, or a mixture thereof.

In some embodiments, the unsaturated alkoxy silane includes a multivinyl siloxane alkoxy silane oligomer of the following structure:

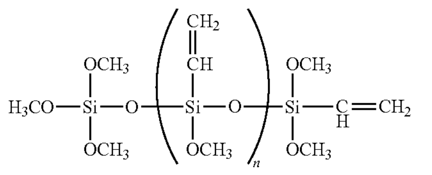

wherein n is an integer from 1 to 50 (e.g., 10). Further examples of suitable multivinyl siloxane alkoxy silane oligomers include DYNASYLAN 6490, a multivinyl siloxane oligomer derived from vinyltrimethoxysilane, and DYNASYLAN 6498, a multivinyl siloxane oligomer derived from vinyltriethoxysilane, both commercially available from Evonik Degussa GmbH (Essen, Germany). Other suitable multivinyl siloxane alkoxy silane oligomers include VMM-010, a vinylmethoxysiloxane homopolymer, and VEE-005, a vinylethoxysiloxane homopolymer, both commercially available from Gelest, Inc. (Morrisville, PA).

The second phase polymer can, for example, be derived from greater than 0% such as 0.05% or more by weight of an unsaturated alkoxy silane monomer, based on the total monomer weight of the second phase (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the second phase polymer can be derived from 15% or less by weight of the unsaturated alkoxy silane monomer, based on the total monomer content of the second phase (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of silane monomer in the second phase polymer can range from any of the minimum values described above to any of the maximum values described above. For example, the second phase polymer can be derived from greater than 0% to 15% by weight of the unsaturated alkoxy silane monomer such as from 1% to 15% by weight of the unsaturated silane monomer, based on the total monomer weight of the second phase (e.g., from 1% to 10%, from 1.5% to 8%, or from 1.5% to 5%).

The second phase polymer can, for example, be derived from greater than 0% such as 0.05% or more by weight of the crosslinking monomers, based on the total monomer weight of the second phase (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the second phase polymer can be derived from 15% or less by weight of the crosslinking monomers, based on the total monomer content of the second phase (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of crosslinking monomers the second phase polymer is derived from can range from any of the minimum values described above to any of the maximum values described above. For example, the second phase polymer can be derived from greater than 0% to 15% by weight of the crosslinking monomers such as from 1% to 15% by weight of the crosslinking monomers, based on the total monomer weight of the second phase (e.g., from 1% to 10%, from 1.5% to 8%, or from 1.5% to 5%).

The second phase polymer can be derived from greater than 0% by weight to 35% by weight of one or more additional ethylenically-unsaturated monomers. For example, the second phase polymer can further include a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, or a combination of these monomers. Suitable vinyl aromatic compounds include styrene, α- and p-methylstyrene, α-butylstyrene, 4-n-butylstyrene, 4-n-decylstyrene, vinyltoluene, and combinations thereof. Vinyl esters of carboxylic acids having up to 20 carbon atoms include, for example, vinyl laurate, vinyl stearate, vinyl propionate, versatic acid vinyl esters, vinyl acetate, and combinations thereof. The vinyl halides can include ethylenically unsaturated compounds substituted by chlorine, fluorine or bromine, such as vinyl chloride and vinylidene chloride. The vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 4 to 8 carbon atoms and two olefinic double bonds, such as butadiene, isoprene, and chloroprene. (Meth)acrylamide derivatives include, for example, keto-containing amide functional monomers defined by the general structure below $$CH_2{=}CR_1C(O)NR_2C(O)R_3$$

wherein $R^1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth)acrylamide derivative can be diacetone acrylamide (DAAM) or diacetone methacrylamide. Sulfur-containing monomers include, for example, sulfonic acids and sulfonates, such as vinylsulfonic acid, 2-sulfoethyl methacrylate, sodium styrenesulfonate, and 2-sulfoxyethyl methacrylate. When present, the sulfur-containing monomers are generally present in an amount greater than 0% by weight to 5% by weight.

The second phase polymer can, for example, be derived from a polyfunctional amine group. The term "polyfunctional amine" as used herein refers to an amine containing molecule comprising two or more amine groups. The polyfunctional amine group is reactive with the unsaturated keto monomer, after polymerization of the second phase polymer. At least a portion of the polyfunctional amine can be present as a pendant group on the copolymer backbone. For example, the polyfunctional amine react with the unsaturated keto monomers present in the copolymer backbone to form a pendant group. In these examples, the polyfunctional amine can react with the unsaturated keto monomer present in the copolymer backbone post polymerization. In further examples, a portion of the one or more polyfunctional amine can be present in the composition but do not covalently bind to the multiphase polymer.

Examples of suitable polyfunctional amines include polyetheramines, polyalkyleneamines, polyhydrazides, or a combination thereof. Specific examples of polyfunctional amines include polyamines sold under the trade names, Baxxodur, Jeffamine, and dytek. In some embodiments amines are difunctional or higher polyfunctional amine-terminated polyoxyalkylene polyols (e.g., Jeffamines or Baxxodur amines, examples being polyetheramine T403, polyetheramine D230, polyetheramine D400, polyetheramine D2000, or polyetheramine T5000). In some embodiments amines include Dytek A, Dytek E P, Dytek HMD, Dytek BHMT, and Dytek DCH-99. In some embodiments, amines are polyhydrazides derived from aliphatic and aromatic polycarboxylic acids including adipic dihydrazide, succinic dihydrazide, citric trihydrazide, isophthalic dihydrazide, phthalic dihydrazide, trimellitic trihydrazide, etc. Other amines include diethylenetriamine, triethylenetetramine, tetraethylenepentamine, pentaethylenehexamine, hexaethyleneheptamine, heptaethyleneoctamine, octaethylenenonamine, higher polyimines e.g., polyethyleneimines and polypropyleneimines, bis(3-aminopropyl)amine, bis(4-aminobutyl)amine, bis(5-aminopentyl)amine, bis(6-aminohexyl)amine, 3-(2-aminoethyl)aminopropylamine, N,N-bis(3-aminopropyl)ethylenediamine, N',N-bis(3-aminopropyl)ethylenediamine, N,N-bis(3-aminopropyl) propane-1,3-diamine, N,N-bis(3-aminopropyl) butane-1,4-diamine, N,N'-bis(3-aminopropyl) propane-1,3-diamine, N,N'-bis(3-aminopropyl) butane-1,4-diamine, N,N,N'N'-tetra(3-aminopropyl)ethylenediamine, N,N,N'N'-tetra(3-aminopropyl)-1,4-butylenediamine, tris(2-aminoethyl)amine, tris(2-aminopropyl)amine, tris(3-aminopropyl)amine, tris(2-aminobutyl)amine, tris(3-aminobutyl)amine, tris(4-aminobutyl)amine, tris(5-aminopentyl)amine, tris(6-aminohexyl)amine, trisaminohexane, trisaminononane, 4-aminomethyl-1,8-octamethylenediamine.

The second phase polymer can, for example, be derived from greater than 0% such as 0.05% or more by weight of the polyfunctional amine, based on the total monomer weight of the second phase (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the second phase polymer can be derived from 15% or less by weight of the polyfunctional amine, based on the total monomer content of the second phase (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of polyfunctional amine the second phase polymer is derived from can range from any of the minimum values described above to any of the maximum values described above. For example, the second phase polymer can be derived from greater than 0% to 15% by weight of the polyfunctional amine such as from 1% to 15% by weight of the polyfunctional amine, based on the total monomer weight of the second phase (e.g., from 1% to 10%, from 1.5% to 8%, or from 1.5% to 5%).

In some embodiments, the second phase polymer is derived from:

(i) one or more (meth)acrylate monomers;
(ii) one or more carboxylic acid-containing monomers;
(iii) one or more multifunctional crosslinking monomers;
(iv) one or more unsaturated keto monomers;
(v) one or more unsaturated alkoxy silane monomer
(vi) one or more polyfunctional amines; and
(vii) optionally one or more additional ethylenically-unsaturated monomers, excluding monomers (i), (ii), (iii), and (iv).

The second phase polymer can be derived from at least 55% by weight of one or more (meth)acrylate monomers (e.g., at least 60% by weight, at least 65% by weight, at least 70% by weight, at least 75% by weight, at least 80% by weight, at least 85% by weight, at least 88% by weight, at least 90% by weight, at least 91% by weight, at least 92% by weight, at least 93% by weight, at least 94% by weight, or at least 95% by weight), based on the total weight of the monomers used to form the second phase copolymer.

In certain embodiments, the second phase polymer, based on total monomer weight of the second phase, is derived from (i) 0.1-5% by weight soft ethylenically unsaturated monomers;
(ii) 80-99% by weight hard ethylenically unsaturated monomers;
(iii) greater than 0 to 5% by weight acid monomer;
(iv) greater than 0 to 5% by weight multifunctional crosslinking monomer;
(v) greater than 0 to 10% by weight or greater than 0 to 5% by weight one or more unsaturated keto monomers;
(vi) greater than 0 to 5% by weight one or more polyfunctional amine; and
(vii) optionally greater than 0 to 5% by weight one or more unsaturated alkoxy silane monomers.

In certain embodiments, the second phase polymer, based on the total monomer weight of the second phase, is derived from (i) 1.5-50% by weight acrylate monomer;
(ii) 50-98% by weight methacrylate monomer;
(iii) greater than 0 to 5% by weight acid monomer;
(iv) greater than 0 to 5% by weight multifunctional crosslinking monomer;
(v) greater than 0 to 10% by weight or greater than 0 to 5% by weight one or more unsaturated keto monomers;
(vi) greater than 0 to 5% by weight one or more polyfunctional amine; and
(vii) optionally greater than 0 to 5% by weight one or more unsaturated alkoxy silane monomers.

In certain embodiments, the second phase polymer, based on the total monomer weight of the second phase monomers, is derived from (i) 1.5-50% by weight acrylate monomer selected from methyl acrylate, butyl acrylate, 2-ethyl hexyl acrylate, or a combination thereof;
(ii) 50-98% by weight methacrylate monomer selected from methyl methacrylate, ethyl methacrylate, ureido methacrylate, n-butyl methacrylate, isobornyl methacrylate, or a combination thereof;

(iii) greater than 0 to 5% by weight acid monomer selected from acrylic acid, itaconic acid, a phosphorous acid monomer, or a salt thereof;

(iv) greater than 0 to 5% by weight multifunctional crosslinking monomer comprising a tri(meth)acrylate monomer;

(v) greater than 0 to 10% by weight or greater than 0 to 5% by weight one or more unsaturated keto monomers selected from diacetone acrylamide or an acetoacetoxy-alkyl(meth)acrylate;

(vi) greater than 0 to 5% by weight one or more polyfunctional amine; and (vii) optionally greater than 0 to 5% by weight one or more unsaturated alkoxy silane monomers.

Third (Soft) Phase Polymer

As described herein, the soft phase polymer can be derived from ethylenically-unsaturated monomers and crosslinking monomers. In some embodiments, the soft phase polymer can include an acrylic-based copolymer, such as a pure acrylic polymer, a styrene-acrylic polymer, or a vinyl-acrylic polymer.

The soft phase polymer can be derived from one or more soft ethylenically-unsaturated monomers. In certain embodiments, the soft phase polymer can be derived from a soft ethylenically-unsaturated monomer selected from the group consisting of n-butyl acrylate, 2-ethylhexyl acrylate, and combinations thereof.

The soft phase polymer can be derived from at least 10% by weight of one or more soft ethylenically-unsaturated monomers, based on the total weight of the monomers used to form the soft phase polymer (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, or at least 80% by weight). The soft phase polymer can be derived from at most 85% by weight of one or more soft ethylenically-unsaturated monomers, based on the total weight of the monomers used to form the soft phase polymer (e.g., at most 80% by weight, at most 75% by weight, at most 70% by weight, at most 65% by weight, at most 60% by weight, at most 55% by weight, at most 50% by weight, at most 45% by weight, at most 40% by weight, at most 35% by weight, at most 30% by weight, at most 25% by weight, at most 20% by weight, or at most 15% by weight). The soft phase polymer can be derived from an amount of one or more soft ethylenically-unsaturated monomers ranging from any of the minimum percentages described above to any of the maximum percentages described above. For example, the soft phase polymer can be derived from 15% to 85% by weight of one or more soft ethylenically-unsaturated monomers, based on the total weight of the monomers used to form the soft phase polymer (e.g., from 15% to 60% by weight, from 25% to 60% by weight, from 30% to 60% by weight, or from 35% to 55% by weight).

The soft phase polymer can be further derived from one or more hard ethylenically-unsaturated monomers. In some embodiments, the soft phase polymer can be derived from one or more hard ethylenically-unsaturated monomers including, but not limited to, methyl acrylate, ureido methacrylate, methyl methacrylate, ethyl methacrylate, n-butyl methacrylate, isobornyl methacrylate, tert-butyl methacrylate, t-butyl acrylate, isobutyl methacrylate, vinyl acetate, hydroxyethyl acrylate, hydroxyethyl methacrylate, cyclohexyl acrylate, cyclohexyl methacrylate, 2-ethoxyethyl methacrylate, 2-phenoxyethyl methacrylate, benzyl acrylate, benzyl methacrylate, hydroxypropyl methacrylate, styrene, 4-acetostyrene, acrylamide, acrylonitrile, 4-bromostyrene, n-tert-butylacrylamide, 4-tert-butylstyrene, 2,4-dimethylstyrene, 2,5-dimethylstyrene, 3,5-dimethylstyrene, isobornyl acrylate, isobornyl methacrylate, 4-methoxystyrene, methylstyrene, 4-methylstyrene, or a combination thereof.

The soft phase polymer can be derived from at least 10% by weight of one or more hard ethylenically-unsaturated monomers, based on the total weight of the monomers used to form the soft phase polymer (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, or at least 80% by weight). The soft phase polymer can be derived from at most 85% by weight of one or more hard ethylenically-unsaturated monomers, based on the total weight of the monomers used to form the soft phase polymer (e.g., at most 80% by weight, at most 75% by weight, at most 70% by weight, at most 65% by weight, at most 60% by weight, at most 55% by weight, at most 50% by weight, at most 45% by weight, at most 40% by weight, at most 35% by weight, at most 30% by weight, at most 25% by weight, at most 20% by weight, or at most 15% by weight). The soft phase polymer can be derived from an amount of one or more hard ethylenically-unsaturated monomers ranging from any of the minimum percentages described above to any of the maximum percentages described above. For example, the soft phase polymer can be derived from 15% to 85% by weight of one or more hard ethylenically-unsaturated monomers, based on the total weight of the monomers used to form the soft phase polymer (e.g., from 15% to 60% by weight, from 25% to 60% by weight, from 30% to 60% by weight, or from 35% to 55% by weight).

In some embodiments, the soft phase polymer can include an ethylenically unsaturated acid monomer. When present, the ethylenically unsaturated acid monomer can be selected from a carboxylic acid monomer, a phosphorous acid monomer, a sulfur acid monomer, or a mixture thereof. In other embodiments, the soft phase polymer does not include an ethylenically unsaturated acid monomer. The soft phase polymer can be derived from 0% or greater by weight of one or more ethylenically unsaturated acid monomers, based on the total weight of the monomers used to form the soft phase polymer (e.g., at least 0.01% by weight, at least 0.05% by weight, at least 0.1% by weight, at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, or at least 6% by weight). The soft phase polymer can be derived from 6% or less by weight of one or more ethylenically unsaturated acid monomers, based on the total weight of the monomers used to form the soft phase polymer (e.g., from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight). The soft phase polymer can be derived from an amount of one or more ethylenically unsaturated acid monomers ranging from any of the minimum percentages described above to any of the maximum percentages described above. For example, the soft phase polymer can be derived from greater than 0% by weight to 6% by weight of one or more ethylenically unsaturated acid monomers, based on the total weight of the monomers used to form the soft phase polymer (e.g., from 0.01% by weight to 6% by weight, from 0.5% by weight to 5% by weight, or from 0.5% by weight to 3% by weight of one or more ethylenically unsaturated acid monomers).

The soft phase polymer disclosed herein can also be derived from a multifunctional crosslinking agent as described herein. For example, the soft phase polymer can include a tri(meth)acrylate, preferably trimethylolpropane triacrylate. The amount of multifunctional crosslinking agent can be 0.01% or more based on the total amount of the monomers in the soft phase polymer (e.g., 0.05% or more, 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, 1.8% or more, 1.9% or more, 2% or more, 2.5% or more, 3% or more, 3.5% or more, or 4% or more). In some examples, the amount of multifunctional crosslinking agent can be 5% or less based on the total amount of the monomers in the soft phase polymer (e.g., 4.5% or less, 4% or less, 3.5% or less, 3% or less, 2.5% or less, 2% or less, 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.4% or less, 0.3% or less, or 0.2% or less). The amount of multifunctional crosslinking agent employed can range from any of the minimum values described above to any of the maximum values described above. For example, the amount of multifunctional crosslinking agent can be from 0.05% to 5% based on the total amount of monomers in the soft phase polymer (e.g., from 0.2% to 5%, from 0.5% to 5%, from 0.05% to 2.5%, from 2.5% to 2%, from 0.05% to 0.5%, from 0.5% to 1%, from 1% to 1.5%, from 1.5% to 2%, from 2% to 2.5%, from 2.5% to 3%, from 3% to 3.5%, from 3.5% to 4%, from 4% to 4.5%, from 4.5% to 5%, from 0.05% to 4%, from 0.05% to 3%, or from 0.05% to 2%).

The soft phase polymer also includes an unsaturated keto monomer as described herein. Preferably, the unsaturated keto monomer can be selected from diacetone acrylamide, an acetoacetoxyalkyl(meth)acrylate, or a combination thereof. The soft phase polymer can be derived from greater than 0% by weight of the unsaturated keto monomers, based on the total weight of the monomers used to form the soft phase polymer (e.g., at least 0.01% by weight, at least 0.05% by weight, at least 0.1% by weight, at least 0.2% by weight, at least 0.3% by weight, at least 0.4% by weight, at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, at least 6% by weight, at least 6.5% by weight, at least 7% by weight, at least 7.5% by weight, at least 8% by weight, at least 8.5% by weight, at least 9% by weight, at least 10% by weight, at least 11% by weight, at least 12% by weight, at least 13% by weight, at least 14% by weight, or at least 15% by weight). The soft phase polymer can be derived from 15% or less by weight of one or more unsaturated keto monomers, based on the total weight of the monomers used to form the soft phase polymer (e.g., from 14% or less by weight, from 13% or less by weight, from 12% or less by weight, from 11% or less by weight, from 10% or less by weight, from 9.5% or less by weight, from 8% or less by weight, from 8.5% or less by weight, from 8% or less by weight, from 7.5% or less by weight, from 7% or less by weight, from 6.5% or less by weight, from 6% or less by weight, from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight). The soft phase polymer can be derived from an amount of one or more unsaturated keto monomers ranging from any of the minimum percentages described above to any of the maximum percentages described above. For example, the soft phase polymer can be derived from greater than 0% by weight to 15% by weight of one or more unsaturated keto monomers, based on the total weight of the monomers used to form the soft phase polymer (e.g., from 0.01% by weight to 15% by weight of one or more unsaturated keto monomers, from 0.01% by weight to 10% by weight of one or more unsaturated keto monomers, from 0.5% by weight to 10% by weight of one or more unsaturated keto monomers, from 0.01% by weight to 5% by weight of one or more unsaturated keto monomers, from 0.5% by weight to 5% by weight of one or more unsaturated keto monomers, or from 0.1% by weight to 3.5% by weight of one or more unsaturated keto monomers).

The soft phase polymer can include a silane crosslinker as described herein. The silane crosslinker can be derived from an organo alkoxy silane, preferably an unsaturated alkoxy silane monomer as described herein.

In some embodiments the unsaturated alkoxy silane monomer can be represented by the formula $$(R^1)-Si-(OR^2)_3 \qquad \text{Formula I}$$

wherein $R^1$ is a vinyl containing group, a (meth)acryl group; and $R^2$ for each occurrence, is independently selected from a $C_1$-$C_{10}$ alkyl group.

In some embodiments, the unsaturated alkoxy silane monomer can be represented by the formula $$(R^1)-Si-(OR^2)_1(R^2)_2 \qquad \text{Formula II}$$

or $$(R^1)-Si-(OR^2)_2(R^2)_1 \qquad \text{Formula III}$$

wherein $R^1$ is a vinyl containing group, a (meth)acryl group; and $R^2$ for each occurrence, is independently selected from a $C_1$-$C_{10}$ alkyl group.

In some examples, the organo alkoxy silane comprises a vinyl alkoxy silane. Exemplary organo alkoxy silanes can include vinyltrimethoxysilane, vinyltriethoxysilane, vinyl tris(2-methoxyethoxysilane), vinyl triisopropoxysilane, (meth)acryloyloxypropyl trimethoxysilane, γ-(meth)acryloxypropyl trimethoxysilane, γ-(meth)acryloxypropyl triethoxysilane, (3-methacryloxypropyl)-trimethoxysilane, (3-methacryloxypropyl)-triethoxysilane, (3-methacryloxypropyl)-triisopropoxysilane, 2-methyl-2-propenoic acid 3-[tris-(1-methylethoxy)-silyl]-propyl ester, (3-methacryloxypropyl)-methyldiethoxysilane, 3-glycidoxypropyl methyldiethoxysilane, 3-glycidoxypropyl methyldimethoxysilane, or a mixture thereof.

In some embodiments, the unsaturated alkoxy silane monomer can include a multivinyl siloxane alkoxy silane oligomer of the following structure:

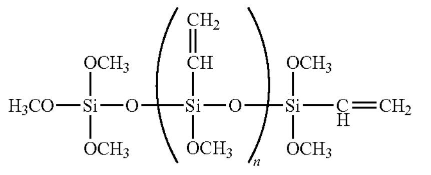

wherein n is an integer from 1 to 50 (e.g., 10). Further examples of suitable multivinyl siloxane alkoxy silane oligomers include DYNASYLAN 6490, a multivinyl siloxane oligomer derived from vinyltrimethoxysilane, and DYNASYLAN 6498, a multivinyl siloxane oligomer derived from vinyltriethoxysilane, both commercially available from Evonik Degussa GmbH (Essen, Germany). Other suitable multivinyl siloxane alkoxy silane oligomers include VMM-010, a vinylmethoxysiloxane homopolymer, and VEE-005, a vinylethoxysiloxane homopolymer, both commercially available from Gelest, Inc. (Morrisville, PA).

The soft phase polymer can, for example, be derived from greater than 0% such as 0.05% or more by weight of the unsaturated alkoxy silane monomer, based on the total monomer weight of the soft phase polymer (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the soft phase polymer can be derived from 15% or less by weight of the unsaturated alkoxy silane monomer, based on the total monomer content of the soft phase polymer (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of alkoxy silane monomer in the soft phase polymer is derived from can range from any of the minimum values described above to any of the maximum values described above. For example, the soft phase polymer can be derived from greater than 0% to 15% by weight of the unsaturated silane monomer such as from 1% to 15% by weight of the unsaturated silane monomer, based on the total monomer weight of the soft phase polymer (e.g., from 1% to 10%, from 1.5% to 8%, or from 1.5% to 5%).

The soft phase polymer can be derived one or more additional polyamine crosslinking monomers which react with keto monomers such as adipic dihydrazide (ADDH).

The soft phase polymer can, for example, be derived from greater than 0% such as 0.05% or more by weight of the crosslinking monomers, based on the total monomer weight of the soft phase polymer (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the soft phase polymer can be derived from 15% or less by weight of the crosslinking monomers, based on the total monomer content of the soft phase polymer (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of crosslinking monomers the soft phase polymer is derived from can range from any of the minimum values described above to any of the maximum values described above. For example, the soft phase polymer can be derived from greater than 0% to 15% by weight of the crosslinking monomers such as from 1% to 15% by weight of the crosslinking monomers, based on the total monomer weight of the soft phase polymer (e.g., from 1% to 10%, from 1.5% to 8%, or from 1.5% to 5%).

The soft phase polymer can be derived from greater than 0% by weight to 35% by weight of one or more additional ethylenically-unsaturated monomers, as described herein. When present, the one or more additional ethylenically-unsaturated monomers are generally present in an amount greater than 0% by weight to 5% by weight.

The soft phase polymer can, for example, be derived from a polyfunctional amine group, as described herein. Examples of suitable polyfunctional amines include polyetheramines, polyalkyleneamines, polyhydrazides, or a combination thereof. Specific examples of polyfunctional amines include polyamines sold under the trade names, Baxxodur, Jeffamine, and dytek. In some embodiments amines are difunctional or higher polyfunctional amine-terminated polyoxyalkylene polyols (e.g., Jeffamines or Baxxodur amines, examples being polyetheramine T403, polyetheramine D230, polyetheramine D400, polyetheramine D2000, or polyetheramine T5000). In some embodiments amines include Dytek A, Dytek E P, Dytek HMD, Dytek BHMT, and Dytek DCH-99. In some embodiments, amines are polyhydrazides derived from alipahtic and aromatic polycarboxylic acids including adipic dihydrazide, succinic dihydrazide, citric trihydrazide, isophthalic dihydrazide, phthalic dihydrazide, trimellitic trihydrazide, etc. Other amines include diethylenetriamine, triethylenetetramine, tetraethylenepentamine, pentaethylenehexamine, hexaethyleneheptamine, heptaethyleneoctamine, octaethylenenonamine, higher polyimines e.g., polyethyleneimines and polypropyleneimines, bis(3-aminopropyl)amine, bis(4-aminobutyl)amine, bis(5-aminopentyl)amine, bis(6-aminohexyl)amine, 3-(2-aminoethyl)aminopropylamine, N,N-bis(3-aminopropyl)ethylenediamine, N',N-bis(3-aminopropyl)ethylenediamine, N,N-bis(3-aminopropyl) propane-1,3-diamine, N,N-bis(3-aminopropyl) butane-1,4-diamine, N,N'-bis(3-aminopropyl) propane-1,3-diamine, N,N'-bis(3-aminopropyl) butane-1,4-diamine, N,N,N'N'-tetra(3-aminopropyl)ethylenediamine, N,N,N'N'-tetra(3-aminopropyl)-1,4-butylenediamine, tris(2-aminoethyl)amine, tris(2-aminopropyl)amine, tris(3-aminopropyl)amine, tris(2-aminobutyl)amine, tris(3-aminobutyl)amine, tris(4-aminobutyl)amine, tris(5-aminopentyl)amine, tris(6-aminohexyl)amine, trisaminohexane, trisaminononane, 4-aminomethyl-1,8-octamethylenediamine, The soft phase polymer can, for example, be derived from greater than 0% such as 0.05% or more by weight of the polyfunctional amine, based on the total monomer weight of the soft phase polymer (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.8% or more, 2% or more, 2.5% or more, 3% or more, 3.5% or more, 4% or more, 4.5% or more, or 5% or more). In some examples, the soft phase polymer can be derived from 15% or less by weight of the polyfunctional amine, based on the total monomer content of the soft phase polymer (e.g., 13% or less, 12% or less, 10% or less, 9% or less, 8% or less, 7% or less, 6% or less, 5.5% or less, 5% or less, 4.5% or less, 4% or less, 3.5% or less, 3% or less, 2.5% or less, 2% or less, or 1.5% or less). The amount of polyfunctional amine the soft phase polymer is derived from can range from any of the minimum values described above to any of the maximum values described above. For example, the soft phase polymer can be derived from greater than 0% to 15% by weight of the polyfunctional amine such as from 1% to 15% by weight of the polyfunctional amine, based on the total monomer weight of the soft phase polymer (e.g., from 1% to 10%, from 1.5% to 8%, or from 1.5% to 5%).

In some embodiments, the soft phase polymer is derived from:

(i) one or more (meth)acrylate monomers;
(ii) one or more carboxylic acid-containing monomers;
(iii) one or more multifunctional crosslinking monomers;
(iv) one or more unsaturated keto monomers;
(v) one or more polyfunctional amine;
(vi) one or more unsaturated alkoxy silane monomers; and
(vii) optionally one or more additional ethylenically-unsaturated monomers, excluding monomers (i), (ii), (iii), and (iv).

The soft phase polymer can be derived from at least 55% by weight of one or more (meth)acrylate monomers (e.g., at least 60% by weight, at least 65% by weight, at least 70% by weight, at least 75% by weight, at least 80% by weight, at least 85% by weight, at least 88% by weight, at least 90% by weight, at least 91% by weight, at least 92% by weight, at least 93% by weight, at least 94% by weight, or at least 95% by weight), based on the total weight of the monomers used to form the soft phase polymer.

In certain embodiments, the soft phase polymer is derived from (i) 15-80% by weight soft ethylenically unsaturated monomers;
(ii) 15-80% by weight hard ethylenically unsaturated monomers;
(iii) 0 to 5% by weight acid monomer;
(iv) greater than 0 to 5% by weight multifunctional crosslinking monomer;
(v) greater than 0 to 10% by weight or greater than 0 to 5% by weight one or more unsaturated keto monomers;
(vi) greater than 0 to 5% by weight one or more polyfunctional amine; and
(vii) greater than 0 to 5% by weight one or more unsaturated alkoxy silane monomers, based on the total monomer weight of the soft phase monomers.

In certain embodiments, the soft phase polymer is derived from (i) 50-80% by weight acrylate monomer;
(ii) 15-35% by weight methacrylate monomer;
(iii) 0 to 5% by weight acid monomer;
(iv) greater than 0 to 5% by weight multifunctional crosslinking monomer;
(v) greater than 0 to 10% by weight or greater than 0 to 5% by weight one or more unsaturated keto monomers;
(vi) greater than 0 to 5% by weight one or more polyfunctional amine; and
(vii) greater than 0 to 5% by weight one or more unsaturated alkoxy silane monomers, based on the total monomer weight of the soft phase monomers.

In certain embodiments, the soft phase polymer is derived from (i) 50-80% by weight acrylate monomer selected from methyl acrylate, butyl acrylate, 2-ethyl hexyl acrylate, or a combination thereof;
(ii) 15-35% by weight methacrylate monomer selected from methyl methacrylate, ethyl methacrylate, ureido methacrylate, n-butyl methacrylate, isobornyl methacrylate, or a combination thereof;
(iii) 0 to 5% by weight acid monomer selected from acrylic acid, itaconic acid, a phosphorous acid monomer, a sulfur acid monomer, or a salt thereof;
(iv) greater than 0 to 5% by weight multifunctional crosslinking monomer comprising a tri(meth)acrylate monomer;
(v) greater than 0 to 10% by weight or greater than 0 to 5% by weight one or more unsaturated keto monomers selected from diacetone acrylamide or an acetoacetoxyalkyl(meth)acrylate;
(vi) greater than 0 to 5% by weight one or more polyfunctional amine; and
(vii) greater than 0 to 5% by weight one or more unsaturated alkoxy silane monomers, based on the total monomer weight of the soft phase monomers.

In addition to the monomers discussed above that are present in the multiphase polymer with respect to the first phase polymer, the second phase polymer, and the soft phase polymer, the multiphase polymer can include one or more additional monomers in one or more phases. The one or more additional monomers present in the multiphase polymer can include one or more (meth)acrylates. The one or more of the (meth)acrylate monomers can include, but are not limited to, n-butyl(meth)acrylate, 2-ethylhexyl(meth)acrylate, ethyl(meth)acrylate, iso-butyl(meth)acrylate, tert-butyl(meth)acrylate, isobutyl(meth)acrylate, n-hexyl(meth)acrylate, n-heptyl(meth)acrylate, 2-methylheptyl(meth)acrylate, octyl(meth)acrylate, isooctyl(meth)acrylate, n-nonyl(meth)acrylate, isononyl(meth)acrylate, n-decyl(meth)acrylate, isodecyl(meth)acrylate, dodecyl(meth)acrylate, heptadecyl(meth)acrylate, lauryl(meth)acrylate, tridecyl(meth)acrylate, stearyl(meth)acrylate, glycidyl(meth)acrylate, allyl(meth)acrylate, tetrahydrofurfuryl(meth)acrylate, cyclohexyl(meth)acrylate, 2-propylheptyl(meth)acrylate, behenyl(meth)acrylate, cyclohexyl methacrylate, t-butyl acrylate, t-butyl methacrylate, stearyl methacrylate, behenyl methacrylate, allyl methacrylate, ethyldiglycol acrylate, iso-4-hydroxylbutyl acrylate, hydroxyethylcaprolactone acrylate, 2-ethoxyethyl acrylate, 2-methoxyethyl acrylate, and combinations thereof. In some examples, the (meth)acrylate monomer comprises butyl(meth)acrylate, ethyl(meth)acrylate, 2-ethylhexyl(meth)acrylate, or a combination thereof. For example, the (meth)acrylate monomer comprises butyl acrylate, ethyl acrylate, 2-ethylhexyl acrylate, or a combination thereof.

The multiphase polymer in one or more phases can be derived from a carboxylic acid anhydride. The carboxylic acid anhydride generally has ethylenic unsaturation and can, for example, be derived from a monocarboxylic acid, a dicarboxylic acid, or a combination thereof. Examples of suitable carboxylic anhydrides include, but are not limited to, (meth)acrylic anhydride, maleic anhydride, itaconic anhydride, citraconic anhydride, and combinations thereof. In some examples, the carboxylic acid anhydride can be selected from the group consisting of itaconic anhydride, maleic anhydride, and combinations thereof. In some examples, the carboxylic acid anhydride includes maleic anhydride.

In some embodiments, the multiphase polymer in one or more phases can include an aminosilane. The aminosilane can be represented by the formula $H_2N—R^1—Si(OR^2)_3$, wherein $R^1$ and $R_2$ are independently, for each occurrence, selected from a $C_1$-$C_{10}$ alkyl group, Exemplary amino alkoxysilanes can include 3-aminopropyl methyldiethoxysilane, 3-aminopropyl trimethoxysilane, 3-aminopropyl triethoxysilane, N-(2-aminoethyl-3-aminopropyl)-trimethoxysilane or combinations thereof.

The multiphase polymer in one or more phases can be derived from other monomers. For example, the multiphase polymer in one or more phases can be derived from vinyl aromatic monomers, vinyl esters of branched mono-carboxylic acids having a total of 2 to 12 carbon atoms in the acid residue moiety and 4 to 14 total carbon atoms such as, vinyl acetate, vinyl 2-ethylhexanoate, vinyl neo-nonanoate, vinyl neo-decanoate, vinyl neo-undecanoate, vinyl neo-dodecanoate and mixtures thereof, diene monomer such as 1,2-butadiene, 1,3-butadiene, 2-methyl-1,3-butadiene, 2-chloro-1,3-butadiene, and isoprene) and copolymerizable surfactant monomers (e.g., those sold under the trademark ADEKA REASOAP).

Suitable vinyl aromatic monomers for use in the copolymers can include styrene or an alkyl styrene such as α- and p-methylstyrene, α-butylstyrene, p-n-butylstyrene, p-n-decylstyrene, vinyltoluene, and combinations thereof. The vinyl aromatic monomer can be present in an amount of 0% by weight or greater (e.g., 1% by weight or greater, 2% by weight or greater, 5% by weight or greater, 10% by weight or greater, 15% by weight or greater, 20% by weight or greater, 25% by weight or greater, from 0% to 45%, from 2% to 40%, from 5% to 35%, from 0% to 15%, from 0% to 10%, from 2% to 10%, or from 0% to 5% by weight), based on the total weight of monomers from which the multiphase polymer is derived.

In some embodiments, the multiphase polymer in one or more phases can include a (meth)acrylamide or a derivative thereof. The (meth)acrylamide derivative include, for example, keto-containing amide functional monomers defined by the general Formula VI below $$CH_2{=}CR_1C(O)NR_2C(O)R_3 \qquad (VI)$$

wherein $R^1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth) acrylamide derivative can be diacetone acrylamide (DAAM).

In some embodiments, the multiphase polymer in one or more phases can include an acetoacetoxy monomer or a derivative thereof. Suitable acetoacetoxy monomers that can be included in the multiphase polymer include acetoacetoxyalkyl (meth)acrylates, such as acetoacetoxyethyl(meth)acrylate (AAEM), acetoacetoxypropyl(meth)acrylate, acetoacetoxybutyl(meth)acrylate, and 2,3-di(acetoacetoxy) propyl (meth)acrylate; allyl acetoacetate; vinyl acetoacetate; and combinations thereof. Sulfur-containing monomers that can be included in the multiphase polymer including, for example, sulfonic acids and sulfonates, such as vinylsulfonic acid, 2-sulfoethyl methacrylate, sodium styrenesulfonate, 2-sulfoxyethyl methacrylate, vinyl butylsulfonate, sulfones such as vinylsulfone, sulfoxides such as vinylsulfoxide, and sulfides such as 1-(2-hydroxyethylthio) butadiene. Examples of suitable phosphorus-containing monomers that can be included in the multiphase polymer include dihydrogen phosphate esters of alcohols in which the alcohol contains a polymerizable vinyl or olefenic group, allyl phosphate, phosphoalkyl (meth)acrylates such as 2-phosphoethyl(meth)acrylate (PEM), 2-phosphopropyl(meth) acrylate, 3-phosphopropyl(meth)acrylate, and phosphobutyl (meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H_2C{=}C(CH_3)COO(CH_2CH_2O)$, $P(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2-methylpropanephosphinic acid, 2-acrylamido-2-methyl propane sulfonic acid or a salt thereof (such as sodium, ammonium, or potassium salts), α-phosphonostyrene, 2-methylacrylamido-2-methylpropanephosphinic acid, (hydroxy)phosphinylalkyl (meth)acrylates, (hydroxy)phosphinylmethyl methacrylate, and combinations thereof. In some embodiments, the multiphase polymer includes 2-acrylamido-2-methyl propane sulfonic acid.

Hydroxy(meth)acrylates that can be included in one or more phases of the multiphase polymer include, for example, hydroxyl functional monomers defined by the general Formula VII below (VII)

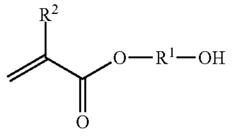

wherein $R^1$ is hydrogen or methyl and $R_2$ is hydrogen, a $C_1$-$C_4$ alkyl group, or a phenyl group. For example, the hydroxyl(meth)acrylate can include hydroxypropyl(meth) acrylate, hydroxybutylacrylate, hydroxybutylmethacrylate, hydroxyethylacrylate (HEA) and hydroxyethylmethacrylate (HEMA).

Other suitable additional monomers that can be included in the multiphase polymer in one or more phases include (meth)acrylonitrile, vinyl halides, vinyl ethers of an alcohol comprising 1 to 10 carbon atoms, aliphatic hydrocarbons having 2 to 8 carbon atoms and one or two double bonds, phosphorus-containing monomers, acetoacetoxy monomers, sulfur-based monomers, hydroxyl(meth)acrylate monomers, methyl(meth)acrylate, ethyl(meth)acrylate, alkyl crotonates, di-n-butyl maleate, di-octylmaleate, acetoacetoxyethyl (meth)acrylate, acetoacetoxypropyl(meth)acrylate, allyl (meth)acrylate, tetrahydrofurfuryl(meth)acrylate, cyclohexyl(meth)acrylate, 2-ethoxyethyl(meth)acrylate, 2-methoxy (meth) acrylate, 2-(2 ethoxyethoxy)ethyl(meth)acrylate, 2-phenoxyethyl(meth)acrylate, isobornyl(meth)acrylate, caprolactone(meth)acrylate, polypropyleneglycol mono (meth)acrylate, polyethyleneglycol (meth)acrylate, benzyl (meth)acrylate, 2,3-di(acetoacetoxy) propyl(meth)acrylate, methylpolyglycol (meth)acrylate, 3,4-epoxycyclohexylmethyl(meth)acrylate, 1,6 hexanediol di(meth)acrylate, 1,4 butanediol di(meth)acrylate, or combinations thereof.

When present, the one or more additional monomers can be present in small amounts (e.g., 10% by weight or less, 7.5% by weight or less, 5% by weight or less, 4% by weight or less, 3% by weight or less, 2% by weight or less, 1.5% by weight or less, 1% by weight or less, or 0.5% by weight or less), based on the total weight of monomers from which the multiphase polymer is derived. The one or more additional monomers when present can be present in an amount of greater than 0%, 0.1% by weight or greater, 0.3% or greater, 0.5% or greater, 0.75% or greater, or 1% or greater by weight, based on the total weight of monomers from which the multiphase polymer is derived.

In some embodiments, the monomers in each phase of the multiphase polymer can be polymerized in the presence of a chain transfer agent. A "chain transfer agent" as used herein refers to chemical compounds that are useful for controlling the molecular weights of polymers, for reducing gelation when polymerizations and copolymerizations involving diene monomers are conducted, and/or for preparing polymers and copolymers with useful chemical functionality at their chain ends. The chain transfer agent reacts with a growing polymer radical, causing the growing chain to terminate while creating a new reactive species capable of initiating polymerization. The phrase "chain transfer agent" is used interchangeably with the phrase "molecular weight regulator."

Suitable chain transfer agents for use during polymerization of the multiphase polymer disclosed herein can include compounds having a carbon-halogen bond, a sulfur-hydrogen bond, a silicon-hydrogen bond, or a sulfur-sulfur bond; an allyl alcohol, or an aldehyde. In some embodiments, the chain transfer agents contain a sulfur-hydrogen bond, and are known as mercaptans. In some embodiments, the chain transfer agent can include $C_3$-$C_{20}$ mercaptans. Specific examples of the chain transfer agent can include octyl mercaptan such as n-octyl mercaptan and t-octyl mercaptan, decyl mercaptan, tetradecyl mercaptan, hexadecyl mercaptan, dodecyl mercaptan such as n-dodecyl mercaptan and t-dodecyl mercaptan, tert-butyl mercaptan, mercaptoethanol such as β-mercaptoethanol, 3-mercaptopropanol, mercaptopropyltrimethoxysilane, tert-nonyl mercaptan, tert-dodecyl mercaptan, 6-mercaptomethyl-2-methyl-2-octanol, 4-mercapto-3-methyl-1-butanol, methyl-3-mercaptopropionate, butyl-3-mercaptopropionate, i-octyl-3-mercaptopropionate, i-decyl-3-mercaptopropionate, dodecyl-3-mercaptopropionate, octadecyl-3-mercaptopropionate, and 2-phenyl-1-mercapto-2-ethanol. Other suitable examples of chain transfer agents that can be used during polymerization of the multiphase polymer include thioglycolic acid, methyl thioglycolate, n-butyl thioglycolate, i-octyl thioglycolate, dodecyl thioglycolate, octadecyl thioglycolate, ethylacrylic esters, terpinolene. In some examples, the chain transfer agent can include tert-dodecyl mercaptan.

In some embodiments, the monomers in the multiphase polymer are polymerized in the absence of a chain transfer agent.

When used, the amount of chain transfer agent utilized during polymerization can be present in an amount of at least 0.1 part by weight per hundred monomers present in the multiphase polymer. For example, the chain transfer agent can be present in an amount of from 1 part to 4 parts, from 1.5 parts to 4 parts, from 1 part to 3.5 parts, from 1.5 parts to 3.5 parts, from 1 part to 3 parts, from 1.5 parts to 3 parts, or from 1 part to 2.5 parts by weight per hundred monomers present in the multiphase polymer during polymerization. When the chain transfer agent is used, the resulting multiphase polymer can contain from about 0.01% to about 4%, from about 0.05% to about 4%, from about 0.1% to about 4%, or from about 0.1% to about 3.5% by weight of the chain transfer agent.

The volume average particle size diameter of the multiphase polymer can be less than 400 nm. In some embodiments, the volume average particle size diameter of the multiphase polymer can be 280 nm or less (e.g., 260 nm or less, 250 nm or less, 240 nm or less, 230 nm or less, 220 nm or less, 200 nm or less, 180 nm or less, 170 nm or less, 160 nm or less, 150 nm or less, 140 nm or less, 120 nm or less, or 100 nm or less). In some embodiments, the volume average particle size diameter of the multiphase polymer can be from 100 nm to 400 nm, from 100 nm to 300 nm, from 100 nm to 250 nm, or from 100 nm to 180 nm.

Compositions

The multiphase polymers disclosed herein can be used in a wide range of applications including coating compositions such as paints. In certain embodiments, the coating compositions can include the multiphase polymer in an amount of from 10% to 90% by weight, preferably from 30% to 80% by weight, of the coating composition. For example, the multiphase polymer can be present in an amount of 10% by weight or greater, 20% by weight or greater, 25% by weight or greater, 30% by weight or greater, 40% by weight or greater, 50% by weight or greater, 60% by weight or greater, 75% by weight or greater, 85% by weight or greater, or up to 100% by weight or greater, based on the total amount of polymers in the compositions described herein. The multiphase polymer can be present in an amount of 10% by weight or greater, 15% by weight or greater, 20% by weight or greater, 25% by weight or greater, 30% by weight or greater, 35% by weight or greater, 40% by weight or greater, 45% by weight or greater, 50% by weight or greater, or up to 100% by weight, based on the total weight of the compositions described herein. In some examples, the multiphase polymer can be present in an amount of from 10% up to 100%, from 10% to 95%, from 10% to 65%, from 10% to 50%, from 20% to 65%, from 30% to 95%, from 40% to 90%, or from 50% to 90%, by weight of the composition.

The coating compositions can further comprise a colorant, an inorganic filler, an adhesion enhancer, a film forming aid, defoamer, a thickener, a tackifier, or a combination thereof. When present, the inorganic filler can be selected from calcium carbonate, titanium dioxide, clay, kaolin, bentonite, mica, talc, natural silica, synthetic silica, natural silicates, synthetic silicates, feldspars, nepheline syenite, wollastonite, diatomite, barite, glass, attapulgite, zeolite, or mixtures thereof. The inorganic filler can be present in an amount of from greater than 0% to 70%, preferably from 5% to 50%, more preferably from 5% to 30% by weight of the total weight of the coating composition.

The multiphase polymers can be used in base paints. Base paints are usually grouped into sets of three or four base paints (light, medium, deep and optionally a clear) to cover the range of colors in each product type. The multiphase polymers disclosed herein are particularly suited for deep base paint coatings. Deep base paint coatings are generally understood by the art as base paint coatings which are intended to have a high level of colored pigments added to them to achieve the desired color, typically a very vivid or dark color. Deep base coatings as disclosed herein refers to any coating formulation designed to accept larger volumes of pigment, though such coating formulations are sometimes referred to not only as deep base, but as accent base, ultra-deep base, and neutral base. These formulations are designed to be able to accept a larger volume (and weight percent) of colored pigment. In one embodiment, paint formulations which include less than 60 pounds/100 gallons of pigmentary-sized pigment (e.g. $TiO_2$) are considered to be deep base formulations. The deep base formulations can be designed, as known in the art, to have any of the paint coating finishes, such as high gloss, semi-gloss, satin, egg shell and flat.

The deep base paint coating can be in the form of an aqueous latex paint composition comprising water, the multiphase polymer as a film-forming polymeric binder in sufficient amount to form a paint film or coating upon drying, one or more pigments, and various additives such as thickeners Typically a clear base paint is tinted with colorants to achieve desired deep color. Colorants are water-based dispersion of a relatively large volume of colored pigment in a relatively small volume of water, including other components such as one or more surfactants, pigment dispersing agents to facilitate dispersion of the pigment content, and optionally inorganic fillers. The colorant can be present in an amount from 2% to 20% by weight of the deep base paint coatings. Examples of colorants are PureOptions™ colorants sold by BASF corporation (see for example, U.S. Pat. No. 9,040,624), ColorCast Ecotoner® from Sherwin Williams Company, and CCA colorants for architectural coatings from Color Corporation of America.

In some embodiments, the PVC of the coatings described herein may be about 45% or less, such as from about 1% and about 45%, about 1% to about 30%, or about 1% to about 10%. Pigment volume concentration (PVC) is often associated with the paint finish, although various finishes may have overlapping ranges of PVC. PVC is the unit volume of pigments as a percentage of the volume of pigments plus the volume of the binder. In certain embodiments, the paint is a "high-gloss paint", which has a low PVC. In certain embodiments, the paint is a "semi-gloss paint", which has a relatively low PVC. In certain other embodiments, the paint is a "satin paint", which has a relatively high PVC. In further other embodiments, the paint is a "flat paint", which has a relatively high PVC compared to satin paint. In addition to the sheens, it is well known in the art to formulate paint compositions to allow for the desired pigment which is added for color. For example, where a near white coating is desired a high volume of $TiO_2$ may be used and a small volume of coloring pigment is necessary. In contrast, where a dark color is preferred in the final coating, a large volume of coloring pigment is needed and a corresponding decrease in the amount of $TiO_2$ is necessary.

The coating compositions described herein can be formulated having a low VOC (Volatile Organic Compounds) content, such as less than 150 grams per liter (g/L), preferably less than 100 g/L or less than 50 g/L. In some embodiments, the coating compositions is substantially free of volatile organic compounds. "Substantially free" means that to the extent the dispersions contain volatile organic compounds, the amount does not result in classification as a material that contributes to the formation of ground-level ozone or smog by the United States Environmental Protection Agency. For example, the coating compositions can include less than 0.1%, less than 0.01%, less than 0.001%, less than 0.0001%, or 0% volatile organic compounds based on the aqueous compositions. In some embodiments, the coating composition include less than or equal to 50 grams per liter (e.g., 45 g/L or less, 40 g/L or less, 35 g/L or less, 30 g/L or less, 25 g/L or less, 20 g/L or less, 15 g/L or less, 10 g/L or less, 9 g/L or less, 8 g/L or less, 7 g/L or less, 6 g/L or less, 5 g/L or less, 4 g/L or less, 3 g/L or less, 2 g/L or less, or 1 g/L or less) of volatile organic compounds. Without wishing to be bound by theory, multifunctional crosslinking agent when included in the multiphase polymer causes enhanced phase separation of the multiphase polymers which give the multiphase polymer a softer domain or surface. The softer domain or surface promotes inter diffusion of polymer chains of the latex from one particle to another. This event can result in a suppressed minimum filming temperature. Thus, the level of volatile organic solvent added to a composition to promote coalescence can be significantly reduced or eliminated.

Inorganic Filler

As described herein, the compositions can further include at least one inorganic filler, also referred to herein as pigments or mineral pigments. Examples of suitable inorganic fillers that can be included in the compositions can be selected from $TiO_2$ (in both anastase and rutile forms), clay (aluminum silicate), $CaCO_3$ (in both ground and precipitated forms), aluminum oxide, silicon dioxide, magnesium oxide, talc (magnesium silicate), bentonite, barytes (barium sulfate), zinc oxide, zinc sulfite, sodium oxide, zeolite, potassium oxide and mixtures thereof. Examples of commercially available titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite clays and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), wollastonite (calcium metasilicate), and combinations thereof. More preferably, the at least one filler includes $TiO_2$, $CaCO_3$, and/or a clay.

Generally, the mean particle sizes of the inorganic filler ranges from about 0.01 to about 50 microns. For example, calcium carbonate particles used in the composition can have a median particle size of from about 0.15 to about 10 microns, such as from about 0.5 to about 7 microns or from about 0.5 to about 5 microns. The filler can be added to the composition as a powder or in slurry form.

The inorganic filler can be present in an amount of 0% by weight or greater, based on the total weight of the compositions described herein. For example, the inorganic filler can be present in an amount of 5% by weight or greater, 10% by weight or greater, 15% by weight or greater, 20% by weight or greater, 25% by weight or greater, 30% by weight or greater, 35% by weight or greater, 40% by weight or greater, 45% by weight or greater, 50% by weight or greater, 55% by weight or greater, 60% by weight or greater, 65% by weight or greater, or up to 80% by weight or greater, based on the total weight of the compositions described herein. In some embodiments, the inorganic filler can be present in an amount of from 0% to 80% by weight, such as from greater than 0% to 80% by weight, from 5% to 80% by weight, from 20% to 80% by weight, from 40% to 80% by weight, from 50% to 80% by weight, from 30% to 75% by weight, from 45% to 65% by weight, based on the total weight of the compositions described herein. In some embodiments, the compositions such as paint compositions do not include a filler.

In some examples, the compositions can further include at least one organic filler such as polyalkylene fibers, preferably polyethylene fibers.

Film-Forming Aids

The composition can further comprise a film forming aid (i.e., a plasticizer). Such materials preferably do not contain water, are miscible with the multiphase polymer, and do not include a reactive group. Suitable film forming aids are known in the art and can include alkyl phthalates, for example, dialkyl phthalates (wherein the alkyl phthalate is mixed $C_7$, $C_9$ and $C_{11}$ linear having an alkyl group), carbonyl phthalate, di-iso-dodecyl phthalate, dioctyl phthalate or dibutyl phthalate, diisononyl phthalate, adipates such as dioctyl adipate, azelates and sebacates, polyols such as polyoxyalkylene polyols or polyester polyols, organic phosphoric- and sulfonic acid esters or polybutenes, hydrogenated terpenes, trioctyl phosphate, epoxy plasticizers, chloro-paraffins, adipic acid esters, n-methylpyrrolidinone, and alkyl naphthalene. Other suitable plasticizers include diethylene glycol dibenzoate, dipropylene glycol dibenzoate, tripropylene glycol dibenzoate, butyl benzyl phthalate, or a combination thereof. Examples of film forming aids include some film forming aids sold under the name Loxanol® and Optifilm™

Film forming aids can be added to the compositions to reduce the glass transition temperature ($T_g$) of the compositions below that of the drying temperature to allow for good film formation. The film forming aid can be present in an amount of from 1% to 15%, based on the dry weight of the multiphase polymer. For example, the film forming aid can be present in an amount of from 5% to 15% or from 7% to 15%, based on the dry weight of the multiphase polymer. In some embodiments, the film forming aid can be present in an effective amount to provide compositions having a measured $T_g$ less than ambient temperature (e.g., 20° C.). In some embodiments, the compositions do not include a plasticizer or a film forming aid. Other suitable plasticizers are described in U.S. Pat. No. 9,534,158 which is incorporated herein by reference in its entirety.

Coalescing Aids

In some embodiments, the compositions can include one or more coalescing aids. Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, alkyl benzoates or combinations thereof. In some embodiments, the compositions can include one or more coalescing aids such as propylene glycol n-butyl ether and/or dipropylene glycol n-butyl ether.

Other suitable additives to the compositions can include defoamers. Defoamers serve to minimize frothing during mixing and/or application of the components. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK-035, available from BYK USA Inc., the TEGO® series of defoamers, available from Evonik Industries, the DREWPLUS® series of defoamers, available from Ashland Inc., and FOAMASTER® NXZ, available from BASF Corporation.

Examples of suitable rheology modifiers (thickeners) can include cellulosic thickeners, alkali swellable polycarboxylic acid polymer thickeners, polyether based thickeners, polyurethane thickeners, waxes such as polyamide waxes, hydrogenated castor oil derivatives, bentonites, laponite, attagel, pyrogenic silicic acids, fumed silica-based thickeners, and metal soaps such as calcium stearate, aluminum stearate, barium stearate, and mixtures thereof. In some embodiments, the filler can provide rheological properties to the compositions.

As described herein, the multiphase polymers described herein can be used in paint compositions, particularly deep base paint compositions. In some embodiments, the paint compositions can include the multiphase polymer, a colorant, an inorganic filler, an adhesion enhancer, a film forming aid, defoamer, a thickener, a tackifier, or a combination thereof. The multiphase polymer and the colorant can be present in the compositions in varying amounts so as to provide a resultant composition with the desired properties for a particular application.

Properties of Coating Compositions

The multiphase polymers allow the production of polymer particle dispersions having lower minimum film forming temperature (MFFT). The MFFT of a polymer as used herein is the temperature where the polymer particle dispersion forms a smooth and crack free coating or film. In contrast to conventional knowledge, incorporation of trimethylolpropane triacrylate reduces the minimum film forming temperature of polymers particles. This unusual crosslinking behavior helps reduce the VOC requirement to form a good film at low VOC. Particularly, the polymers generally form film at low MFFTs of 40° C. or less. In aqueous based polymer dispersions, the lower limit of MFFT for the compositions will be the freezing point of the aqueous carrier phase. This will usually be about 0° C., in some cases, slightly lower because of any dissolved constituent(s). Therefore, the range of MFFT for the polymer compositions will usually be about 40° C. or less, such as from about −5° C. to about 30° C., or from about −5° C. to about 20° C., as determined by ASTM D 2354-10. The minimum film forming temperature (MFFT) of the polymer compositions can be measured by initially casting films using a 75 μm gap bar. The films are allowed to equilibrate for two hours. Temperature measurements were obtained on the MFFT bar where the film transitioned from a continuous clear film to a cloudy or cracked film (crack point).

The multiphase polymers also achieve coatings of good pendulum hardness according to ASTM D 4366-16, print resistance according to ASTM D2064-91; block resistance according to ASTM D4946; and scrub resistance as determined by ASTM D2486-06.

In certain embodiments, when applied to a surface as a film, the coating composition formulated using polymer dispersions as described herein may develop a less tacky surface compared to coating composition formulated using identical polymer dispersions but without the combination of crosslinkers within less than 24 hours at room temperature. For example, the compositions including the multiphase polymer as disclosed herein can develop a less tacky surface within less than 20 hours, less than 18 hours, less than 15 hours, or less than 12 hours. The test used to determine the tack-free time is as provided in the experimental section.

The films may also exhibit a print resistance rating of at least 4, such as from 4 to 10 or from 6 to 8 after 24 hours, according to ASTM D2064-91.

The films may exhibit minimal tendencies of blocking (i.e., the adhesion of the coated surface to another coated surface, or the adhesion of the coated surface to an uncoated surface) of the coated substrate. The adhesion of the films can be measured using the method described in ASTM D 4946-89 (2012) entitled "Standard Test Method for Blocking Resistance of Architectural Paints". Briefly, films are applied as a 7 mil wet film thickness to a Leneta plain white chart and allowed to dry for a designated period before testing (1 day, 3 days and 7 days). A 1000 g weight is placed on top of a rubber stopper on top of a face-to-face specimen and held for 30 minutes at either room temperature or 50° C. Samples are cooled to room temperature and rated using the ten point scale described in the ASTM standard (10=no tack, perfect; 9=trace tack, excellent; 8=slight tack, very good; 7=slight tack, good; 6=moderate tack, good; 5=moderate tack, fair; 4=severe tack, no seal, fair; 3=5-25% seal, poor; 2=25-50% seal, poor; 1=50-75% seal, poor; 0=complete seal, very poor tack). In some embodiments, the films exhibit a block resistance of at least 5 or at least 7 at 50° C., as measured in accordance with ASTM D 4946-89.

The films may exhibit a pendulum hardness of at least 6 or at least 7, as determined by ASTM D 4366-16.

Methods

In some examples, the multiphase polymer is prepared by polymerizing the monomers using free-radical emulsion polymerization. The emulsion polymerization can be carried out as a batch process, as a semi-batch process, or in the form of a continuous process. In some embodiments, a portion of the monomers can be heated to the polymerization temperature and partially polymerized, and the remainder of the monomer batch can be subsequently fed to the polymerization zone continuously, in steps, or with superposition of a concentration gradient. In some embodiments, the method of making a multiphase polymer comprises (i) polymerizing monomers including an ethylenically unsaturated acid monomer, a multifunctional crosslinking monomer, and one or more (meth)acrylates to form a second phase polymer having a $T_g$ of from 40° C. to 240° C. by emulsion polymerization, wherein the monomers of step i) are polymerized in the presence of a first phase polymer, and wherein the first phase polymer has a $T_g$ of from 60° C. to 240° C., preferably from 80° C. to 240° C., or more preferably from 80° C. to 150° C.

(ii) polymerizing monomers including one or more multifunctional crosslinking monomer, one or more (meth) acrylates, an unsaturated keto monomer, and an unsaturated alkoxy silane monomer to form a soft phase polymer having a $T_g$ of from −25° C. to 30° C., preferably from −25° C. to 15° C., or more preferably from −15° C. to less than 15° C. by emulsion polymerization, wherein the monomers of step ii) are polymerized in the presence of the second phase polymer; and (iii) adding a polyfunctional amine to the product formed from step ii) to produce the multiphase polymer.

The emulsion polymerization can be performed with a variety of auxiliaries, including water-soluble initiators and regulators. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Reduction-oxidation (redox) initiator systems are also suitable as initiators for the emulsion polymerization. The redox initiator systems are composed of at least one, usually inorganic, reducing agent and one organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems can be used in the company of soluble metal compounds whose metallic component is able to exist in a plurality of valence states. Typical redox initiator systems include, for example, ascorbic acid/iron (II) sulfate/sodium peroxodisulfate, tert-butyl hydroperoxide/sodium disulfite, tert-butyl hydroperoxide/Na hydroxymethanesulfinate, or tert-butyl hydroperoxide/ascorbic acid. The individual components, the reducing component for example, can also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. The concentration can be 0.1% to 30%, 0.5% to 20%, or 1.0% to 10%, by weight, based on the solution. The amount of the initiators is generally 0.1% to 10% or 0.5% to 5% by weight, based on the monomers to be polymerized. It is also possible for two or more different initiators to be used in the emulsion polymerization. For the removal of the residual monomers, an initiator can be added after the end of the emulsion polymerization.

In the polymerization it is possible to use molecular weight regulators or chain transfer agents, in amounts, for example, of 0 to 0.8 parts by weight, based on 100 parts by weight of the monomers to be polymerized, to reduce the molecular weight of the polymer. Suitable examples include compounds having a thiol group such as tert-butyl mercaptan, thioglycolic acid ethylacrylic esters, mercaptoethanol, mercaptopropyltrimethoxysilane, and tert-dodecyl mercaptan. Additionally, it is possible to use regulators without a thiol group, such as terpinolene. In some embodiments, the emulsion polymer is prepared in the presence of greater than 0% to 0.5% by weight, based on the monomer amount, of at least one molecular weight regulator. In some embodiments, the emulsion polymer is prepared in the presence of less than less than 0.3% or less than 0.2% by weight (e.g., 0.10% to 0.15% by weight) of the molecular weight regulator.

Dispersants, such as surfactants, can also be added during polymerization to help maintain the dispersion of the monomers in the aqueous medium. For example, the polymerization can include less than 3% by weight or less than 1% by weight of surfactants. In some embodiments, the polymerization is substantially free of surfactants and can include less than 0.05% or less than 0.01% by weight of one or more surfactants. In other embodiments, the first emulsion polymerization step and/or the second polymerization step further comprise an aryl phosphate surfactant. (e.g., a tristyrylphenol alkoxylated phosphate surfactant).

Anionic and nonionic surfactants can be used during polymerization. Suitable surfactants include ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids.

In some instances, the multiphase polymer comprises latex particles having the second phase polymer disposed on a surface of the first phase polymer, preferably wherein the first phase polymer forms an inner phase and the second phase polymer surrounds the inner phase. The soft phase polymer may or may not encapsulate the second phase polymer.

As disclosed herein, the multiphase polymer can be used in various compositions. The compositions can be used for several applications, including paints such as deep base paints. The composition can be applied to a surface by any suitable coating technique, including spraying, rolling, brushing, or spreading (for example using a trowel). The composition can be applied in a single coat, or in multiple sequential coats (e.g., in two coats or in three coats) as required for a particular application. Generally, the composition is allowed to dry under ambient conditions. However, in certain embodiments, the composition can be dried, for example, by heating and/or by circulating air over the composition. The composition can have a dry film thickness of 2 mils or greater, such as 5 mils or greater, 10 mils or greater, 15 mils or greater, 20 mils or greater, or 25 mils or greater. In some embodiments, the composition can have a dry film thickness of 30 mils or less, such as 25 mils or less, 20 mils or less, 15 mils or less, 10 mils or less, or 5 mils or less.

By way of non-limiting illustration, examples of certain embodiments of the present disclosure are given below.

EXAMPLES

Example 1: Preparation of High Gloss Deep Base Paint

Low PVC coatings like deep base architectural coatings (deep colors like blue, green, red, etc) are soft and tacky. The low PVC reduces the hardness of the coating. The situation is worsened by soft polymers required to form good films at low VOC. The situation is further worsened by large amount of low VOC colorants, which has soft materials, used to get deep colors. These coatings are soft and tacky, resulting in poor block resistance and poor print resistance.

In the present example, multiphase polymer particles comprising multifunctional acrylate trimethylol propane triacrylate, unsaturated alkoxysilane vinyltriethoxy silane and unsaturated keto monomers (acetoacetoxyethyl methacrylate or diacetone acrylamide) and polyfunctional amine were prepared. The polymer particles form films at low VOC and provide good hardness in deep base paints. In contrary to conventional knowledge, incorporation of trimethylolpropane triacrylate reduces minimum film forming temperature of polymers particles. This unusual reduction in MFFT in combination with crosslinking from keto monomer, alkoxy silane monomer, and polyamine helps to increase the toughness of the coatings at the same time reducing the VOC requirement to form good film at low VOC.

Synthesis of first phase polymer: 941.5 grams water, 0.53 grams Trilon BX, and 77.35 grams Calsoft L40S surfactant were charged to a polymerization vessel under nitrogen atmosphere and equipped with agitator, metering devices, and temperature regulators. This initial charge was heated to 80° C. with stirring. A solution of 4.9 grams of sodium persulfate in 93.1 grams of water was added to the polymerization vessel at 80° C. Then separate feeds of 700 grams of styrene and a solution of 205.6 grams of Calsoft L40S surfactant in 237.1 grams of water were fed into the reactor over 3 hours. Then 0.7 grams of sodium persulfate in 13.3 grams of water was added to the reactor over an hour. 30 minutes after the end of the sodium persulfate feed, the polymer was cooled to room temperature and a solution of 66.5 grams of Calsoft L40S surfactant in 191.7 grams of water was added and mixed for 10 minutes. The resulting polymer had a solids content of 33.4% and a particle size of 28 nm.

Synthesis of second phase polymer and soft phase polymer: A polymerization vessel under nitrogen atmosphere and equipped with metering devices and temperature regulation was charged with the reactor charge (Tables 1 and 2). This initial charge was heated to 85° C. with stirring. When set temperature was reached, 12.0 grams of feed 1 (31%) was added and the mixture was stirred for 5 minutes. Thereafter feed 2 was metered in over 0.85 hours. Three minutes after the end of feed 2, feed 3 and remaining 69% of feed 1 were added over 1.8 hours. Then the monomer vessel and feed lines were flushed with feed 4 water. Ten minutes after the end of feeds 1 and 3, the temperature was reduced to 80° C. 30 minutes after the end of feeds 1 and 3, feeds 5 and 6 were metered in over an hour in parallel. After 30 minutes from the end of the feeds 5 and 6, Feed 7 was added and the batch was cooled to 50° C. Feed 8 was added over 10 minutes and then feed 9 in case of example 4, Example 5, and Example 6 were added over 20 minutes. The feed line was rinsed with feed 10. The pH of the polymer dispersion was adjusted to 8.5 in case of example 1, example 2, example 3 and example 6, using 19% ammonia solution. % Weight solids, pH, particle size, and minimum film forming temperature (MFFT) of the polymer dispersion were measured.

Coatings were prepared according to Tables 3 and 4 using the multiphase polymers from Tables 1 and 2 and colorants described in Table 5. Properties of the coating compositions are shown in Table 6.

TABLE 1

Synthesis of multiphase polymers.

| | Ingredients | Example 1 | Example 2 | Example 3 | Example 4 |
|---|---|---|---|---|---|
| Reactor Charge | Water | 320.81 | 320.8 | 320.8 | 333.76 |
| | First phase polymer | 45.83 | 45.83 | 45.83 | 30.79 |
| Feed 1 | Water | 1.47 | 1.47 | 1.47 | 1.47 |
| | Sodium Persulfate | 37.15 | 37.15 | 37.15 | 37.44 |
| Feed 2 | Water | 183.55 | 183.55 | 183.55 | 183.42 |
| | Disponil SDS 15 | 19.55 | 19.55 | 19.55 | 15.11 |
| | 19% aq. NaOH | 0.0 | 0.0 | 0.0 | 11.93 |
| | 19% aq. $NH_4OH$ | 5.15 | 5.15 | 5.15 | 0.0 |
| | Itaconic acid | 8.8 | 8.8 | 8.8 | 3.92 |
| | Acrylic acid | 0.0 | 0.0 | 0.0 | 4.93 |
| | n-Butyl acrylate | 24.4 | 24.4 | 24.4 | 24.63 |
| | Methyl methacrylate | 284.0 | 281.1 | 281.1 | 286.91 |
| | Ureido methacrylate | 19.55 | 19.55 | 19.55 | 19.71 |
| | Trimethylolpropane triacrylate | 0.0 | 2.93 | 5.87 | 1.97 |
| | Acetoacetyl ethyl methacrylate | 0.0 | 0.0 | 0.0 | 3.94 |
| | Visiomer VTEO | 0.0 | 0.0 | 0.0 | 1.48 |
| Feed 3 | Water | 177.0 | 177.0 | 177.0 | 178.37 |
| | Disponil SDS 15 | 28.03 | 28.03 | 28.03 | 28.24 |
| | n-Butyl acrylate | 332.4 | 332.42 | 332.4 | 229.17 |
| | Methyl methacrylate | 279.14 | 273.27 | 276.2 | 157.35 |
| | Methyl acrylate | 0.0 | 0.0 | 0.0 | 197.05 |
| | Trimethylolpropane triacrylate | 0.0 | 5.87 | 0.0 | 3.94 |
| | Acetoacetyl ethyl methacrylate | 0.0 | 0.0 | 0.0 | 7.88 |
| | Ureido methacrylate | 29.33 | 29.33 | 29.33 | 39.41 |
| | Visiomer VTEO | 0.0 | 0.0 | 0.0 | 2.96 |
| Feed 4 | Water | 39.1 | 39.1 | 39.1 | 19.7 |
| Feed 5 | Water | 24.43 | 24.43 | 24.43 | 4.52 |
| | Aqueous t-butyl hydroperoxide (70%) | 0.7 | 0.7 | 0.7 | 0.7 |

TABLE 1-continued

| Synthesis of multiphase polymers. | | | | | |
|---|---|---|---|---|---|
| | Ingredients | Example 1 | Example 2 | Example 3 | Example 4 |
| Feed 6 | Water | 24.43 | 24.43 | 24.43 | 4.93 |
| | Sodium meta bisulfite | 0.49 | 0.49 | 0.49 | 0.49 |
| Feed 7 | Drewplus L-108 | 0.2 | 0.2 | 0.2 | 0.2 |
| Feed 8 | Water | 44.72 | 44.72 | 44.72 | 47.16 |
| | 19% aq. $NH_4OH$ | 5.15 | 5.15 | 5.15 | 0.0 |
| | 19% aq. NaOH | 0.0 | 0.0 | 0.0 | 2.59 |
| Feed 9 | Water | 0.0 | 0.0 | 0.0 | 59.12 |
| | Baxxodur EC 310 | 0.0 | 0.0 | 0.0 | 9.46 |
| Feed 10 | Water | 19.55 | 19.55 | 19.55 | 19.59 |
| % Weight solids | | 49.5 | 50.2 | 49.4 | 50.6 |
| pH | | 8.5 | 8.5 | 8.5 | 9.6 |
| Particle size, vol. avg, nm | | 143 | 197 | 263 | 231 |
| MFFT (° C.) | | 38 | 23 | 26 | 17 |

TABLE 2

| Synthesis of multiphase polymers. | | | |
|---|---|---|---|
| | Ingredients | Example 5 | Example 6 |
| Reactor Charge | Water | 346.2 | 305.9 |
| | First phase polymer | 9.18 | 89.3 |
| | 10% aq. $NH_4OH$ | 0.0 | 5.24 |
| Feed 1 | Water | 37.23 | 36.18 |
| | Sodium Persulfate | 1.47 | 1.9 |
| Feed 2 | Water | 184.75 | 186.59 |
| | Disponil SDS 15 | 19.59 | 14.6 |
| | 19% aq. $NH_4OH$ | 4.12 | 0.0 |
| | Itaconic acid | 3.92 | 9.52 |
| | Acrylic acid | 4.90 | 0.0 |
| | n-Butyl acrylate | 24.49 | 14.47 |
| | Methyl methacrylate | 280.17 | 279.65 |
| | Ureido Methacrylate | 19.59 | 19.04 |
| | Trimethylolpropane triacrylate | 0.98 | 2.22 |
| | Acetoacetyl ethyl methacrylate | 0.0 | 0.0 |
| | Visiomer VTEO | 1.47 | 0.0 |
| | Diacetone acrylamide | 0.0 | 13.33 |
| Feed 3 | Water | 177.35 | 172.37 |
| | Disponil SDS 15 | 28.08 | 27.3 |
| | n-Butyl acrylate | 235.11 | 283.74 |
| | Methyl methacrylate | 157.72 | 106.26 |
| | Methyl acrylate | 195.93 | 190.43 |
| | Trimethylolpropane triacrylate | 5.88 | 3.81 |
| | Acetoacetyl ethyl methacrylate | 7.84 | 0.0 |
| | Ureido methacrylate | 39.19 | 19.04 |
| | Visiomer VTEO | 2.45 | 0.5 |
| | Diacetone acrylamide | 0.0 | 10.66 |
| Feed 4 | Water | 39.1 | 9.51 |
| Feed 5 | Water | 24.48 | 4.57 |
| | Aqueous t-butyl hydroperoxide (70%) | 0.7 | 0.68 |
| Feed 6 | Water | 24.49 | 4.76 |
| | Sodium meta bisulfite | 0.49 | 0.48 |
| Feed 7 | Drewplus L-108 | 0.2 | 0.2 |
| Feed 8 | Water | 39.79 | 4.9 |
| | 19% aq. $NH_4OH$ | 11.34 | 5.5 |
| Feed 9 | Water | 39.19 | 142.82 |
| | Baxxodur EC 310 | 5.58 | 0.0 |
| | Adipic dihydrazide | 0.0 | 11.43 |
| Feed 10 | Water | 19.7 | 9.52 |
| % Weight solids | | 49.8 | 50.3 |

TABLE 2-continued

| Synthesis of multiphase polymers. | | |
|---|---|---|
| Ingredients | Example 5 | Example 6 |
| pH | 9.46 | 8.5 |
| Particle size, vol. avg, nm | 214 | 98 |
| MFFT (° C.) | 15 | 1 |

TABLE 3

| Clear Base Coating Formulations | | | | | | |
|---|---|---|---|---|---|---|
| Ingredients | S1 | S2 | S3 | S4 | S5 | S6 |
| Water | 44.5 | 44.5 | 44.5 | 44.5 | 44.5 | 44.5 |
| Natrosol ™ Plus 330 | 0.7 | 0.7 | 0.7 | 0.7 | 0.7 | 0.7 |
| $NH_4OH$ 28% aq. Solution | 0.1 | 0.1 | 0.1 | 0.1 | 0.1 | 0.1 |
| Tamol ™165A | 2.2 | 2.2 | 2.2 | 2.2 | 2.2 | 2.2 |
| BYK 022 | 0.3 | 0.3 | 0.3 | 0.3 | 0.3 | 0.3 |
| Hydropalat ™ WE 3320 (Pluracoat CF 20) | 1.3 | 1.3 | 1.3 | 1.3 | 1.3 | 1.3 |
| Aquaflow ™ NHS 310 | 15.6 | 15.6 | 15.6 | 15.6 | 15.6 | 15.6 |
| Minex ™ 10 | 8.9 | 8.9 | 8.9 | 8.9 | 8.9 | 8.9 |
| Attagel ™ 50 | 1.8 | 1.8 | 1.8 | 1.8 | 1.8 | 1.8 |
| Proxel ™ BD20 | 0.7 | 0.7 | 0.7 | 0.7 | 0.7 | 0.7 |
| Polyphase ™ 678 | 1.6 | 1.6 | 1.6 | 1.6 | 1.6 | 1.6 |
| Byk 024 | 0.9 | 0.9 | 0.9 | 0.9 | 0.9 | 0.9 |
| Example 1 | 256.3 | | | | | |
| Example 2 | | 260.2 | | | | |
| Example 3 | | | 260.7 | | | |
| Example 4 | | | | 254.2 | | |
| Example 5 | | | | | 258.6 | |
| Example 6 | | | | | | 255.8 |
| Water | 55.6 | 51.7 | 51.2 | 57.7 | 53.3 | 56.1 |
| Velate ™ 368 | 6.2 | 6.2 | 6.2 | 6.2 | 6.2 | 6.2 |
| Optifilm ™ 400 | 3.9 | 3.9 | 3.9 | 3.9 | 3.9 | 3.9 |
| Acrysol ™ RM 8W | 4.4 | 4.4 | 4.4 | 4.4 | 4.4 | 4.4 |
| Total Weight | 405.0 | 405.0 | 405.0 | 405.0 | 405.0 | 405.0 |

TABLE 4

| Deep Base Paint Coating Formulations | | | | | | |
|---|---|---|---|---|---|---|
| Ingredients | S7* | S8 | S9 | S10 | S11 | S12 |
| S1 (g) | 100 | | | | | |
| S2 (g) | | 100 | | | | |
| S3 (g) | | | 100 | | | |
| S4 (g) | | | | 100 | | |
| S5 (g) | | | | | 100 | |
| S6 (g) | | | | | | 100 |
| Colorant Mixture (g) | 17.3 | 17.3 | 17.3 | 17.3 | 17.3 | 17.3 |
| Velate ™ 368 (g) | 0.4 | 0.0 | 0.0 | 0.0 | 0.0 | 0.0 |
| Total Weight | 117.3 | 117.3 | 117.3 | 117.3 | 117.3 | 117.3 |

*-used more coalescing agent (Velate ™ 368) to form crack less film at 5° C. and 50% humidity due to higher MFFT of the multiphase polymer particles used. These polymer particles are synthesized without multifunctional crosslinking monomers.

TABLE 5

| Colorant Mixture | |
|---|---|
| Colorant | Mass (g) |
| PureOptions ™ Colorant BL* | 109.5 |
| PureOptions ™ Colorant EUL* | 96 |
| PureOptions ™ Colorant LL* | 164.7 |
| Pure Options ™ Colorant KXL* | 277.5 |
| Total | 647.7 |

*Available from BASF corporation

TABLE 6

| Coatings properties | | | | | | |
|---|---|---|---|---|---|---|
| | Paint S7 | Paint S8 | Paint S9 | Paint S10 | Paint S11 | Paint S12 |
| Low temperature cure (LTC) | Pass | Pass | Pass | Pass | Pass | Pass |
| Print resistance at 50° C.; 24 hours cured coating | 2 | 2 | 4 | 8 | 6 | 8 |
| Block resistance at 50° C., 24 hours cured coating | 0 | 0 | 0 | 7 | 5 | 6 |
| Block resistance at 24.5° C., 24 hours cured coating | 7 | 7 | 7 | 9 | 6 | 8 |
| Tackiness at 50° C., 24 hours cured coating, | 4 | 3 | 2 | 1 | 2 | 1 |
| Pendulum Hardness at 24.5° C., 24 hours cured coating | 7 | 7 | 6 | 15 | 10 | 11 |

Test Methods:

Print resistance test was tested according to ASTM D 2064-91 with a minor modifications. The modifications were coatings were drawn down with 255 μm (instead of 150 μm) Erichsen drawdown applicator model 97181; the weight used was 500 grams (instead of 500 grams) and the temperature of testing was 50° C.

Block resistance test was tested according to ASTM D 4946-89 test method as followed. Paints were drawn down using BYK 7 mil Dow latex film caster on a Leneta plain white sealed paper and cured for 24 hours at 50% humidity and 76° F. temperature.

Cotton ball tackiness test: Paints were drawn down using BYK 7 mil Dow latex film caster on a Leneta plain white sealed paper and cured for 24 hours at 50% humidity and 76° F. temperature. A cotton ball was placed on the paint surface and over the cotton ball a 500 grams weight was placed. The sample was placed in a 50° C. oven for an hour. After one hour, the sample was cooled to ambient temperature for 30 minutes and then the cotton ball was removed. The test samples were rated on a scale of 0 to 5 with 0 being no cotton fiber sticking to the paint surface and 5 being a thick layer of cotton fibers sticking to the entire test paint surface area. The amount of cotton fibers increases with increase in tackiness of the paint surface.

Pendulum hardness test was tested according to ASTM D 4366-16 and the results are reported in seconds.

Minimum film forming temperature (MFFT) was measured according ASTM D 2354-10. A 75 μm one inch cube applicator was used.

Low temperature film formation (LTC): The paints, BYK 10 mil Dow latex film caster, and Leneta Form 19BR Penopec chart were placed in an Environmental chamber at 5° C. temperature and 50% humidity for an hour. Then paints were quickly drawn down using the film caster on the Penopec chart and immediately placed in the environmental chamber at 5° C. temperature and 50% humidity. The charts were taken out of the environmental chamber after 24 hours and examined for any crack in films. Crack free films are rated pass and cracked films are rated fail.

Summary The coating compositions provided in this example achieve low PVC and low VOC deep base coatings. The coatings formulated with combination of crosslinkers are harder, leading to lower tacky surface and good block resistance and print resistance at the same time surprisingly reduce the VOC coalescent requirement.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The invention claimed is:

1. A multiphase polymer comprising:

a first phase polymer having a $T_g$ of from 60° C. to 240° C.;

a second phase polymer having a $T_g$ of from 40° C. to 240° C., and is derived from monomers including an ethylenically unsaturated acid monomer, a multifunctional crosslinking monomer, and one or more (meth) acrylates, a soft phase polymer having a $T_g$ of from −25° C. to 30° C., and is derived from monomers including one or more multifunctional crosslinking monomers, one or more (meth)acrylates, an unsaturated keto monomer, an unsaturated alkoxy silane monomer, and a polyfunctional amine.

2. The multiphase polymer of claim 1, wherein the first phase polymer is derived from monomers including a methacrylate monomer, a vinyl aromatic monomer, or a combination thereof.

3. The multiphase polymer of claim 1, wherein the first phase polymer is derived from greater than 0% by weight, based on a total weight of the first phase polymer, styrene.

4. The multiphase polymer of claim 1, wherein the first phase polymer is present in an amount of 10% by weight or less, based on a total weight of the multiphase polymer.

5. The multiphase polymer of claim 1, wherein the ethylenically unsaturated acid monomer in the second phase polymer is selected from a carboxylic acid monomer, a phosphorous acid monomer, a sulfur acid monomer, or a mixture thereof.

6. The multiphase polymer of claim 5, wherein the ethylenically unsaturated acid monomer is selected from acrylic acid; methacrylic acid; itaconic acid; maleic acid; fumaric acid; crotonic acid; a phosphorous acid monomer; a vinyl phosphonic acid; allyl phosphonic acid; 2-acrylamido-2-methylpropanephosphonic acid; α-phosphonostyrene; 2-methylacrylamido-2-methylpropane phosphonic acid; 2-phosphoethyl(meth)acrylate; 2-phosphopropyl(meth) acrylate; 3-phosphopropyl(meth)acrylate; 3-phospho-2-hydroxypropyl (meth)acrylate; 2-acrylamido-2-methyl propane sulfonic acid; styrene sulfonic acid; a mixture thereof, or a salt thereof.

7. The multiphase polymer of claim 1, wherein the ethylenically unsaturated acid monomer is present in the second phase polymer, in an amount from 0.01% to 6% by weight of the second phase polymer.

8. The multiphase polymer of claim 1, wherein the soft phase polymer, the first phase polymer, or both do not include an acid monomer.

9. The multiphase polymer of claim 1, wherein the multifunctional crosslinking monomer comprises two or more polymerizable carbon-carbon double bonds.

10. The multiphase polymer of claim 1, wherein the multifunctional crosslinking monomer is selected from a divinyl monomer, a diallyl monomer, a trivinyl monomer, a triallyl monomer, an ally(meth)acrylate, a di(meth)acrylate, a tri(meth)acrylate, a tetra(meth)acrylate, a penta(meth) acrylate), or a combination thereof.

11. The multiphase polymer of claim 1, wherein the multifunctional crosslinking monomer comprises a tri(meth) acrylate.

12. The multiphase polymer of claim 1, wherein the multifunctional crosslinking monomer is present in the second phase polymer, in an amount from 0.01% to 5% by weight of the second phase polymer.

13. The multiphase polymer of claim 1, wherein the multifunctional crosslinking monomer is present in the soft phase polymer, in an amount from 0.01% to 5% by weight of the soft phase polymer.

14. The multiphase polymer of claim 1, wherein the multifunctional crosslinking monomer is present in an amount from 0.02% to 10% by weight of the multiphase polymer.

15. The multiphase polymer of claim 1, wherein the one or more (meth)acrylates comprise at least one methacrylate monomer and at least one acrylate monomer.

16. The multiphase polymer of claim 1, wherein the one or more (meth)acrylates comprise a methacrylate monomer selected from methyl methacrylate, ureido methacrylate, n-butyl methacrylate, isobornyl methacrylate or a combination thereof.

17. The multiphase polymer of claim 1 wherein the one or more (meth)acrylates comprise an acrylate monomer selected from methyl acylate, ethyl acrylate, n-butyl acrylate, 2-ethylhexyl acrylate, or a combination thereof.

18. The multiphase polymer of claim 15, wherein the second phase polymer comprises at least one methacrylate monomer in an amount from 40% to 90% of the second phase polymer.

19. A method of making a multiphase composition, comprising:

a) polymerizing monomers including an ethylenically unsaturated acid monomer, a multifunctional crosslinking monomer, and one or more (meth)acrylates to form a second phase polymer having a $T_g$ of from 40° C. to 240° C. by emulsion polymerization;

wherein the monomers of step a) are polymerized in the presence of a first phase polymer, and wherein the first phase polymer has a $T_g$ of from 60° C. to 240° C.;

b) polymerizing monomers including one or more multifunctional crosslinking monomer, one or more (meth) acrylates, an unsaturated keto monomer, and an unsaturated alkoxy silane monomer to form a soft phase polymer having a $T_g$ of from −25° C. to 30° C. by emulsion polymerization, wherein the monomers of step b) are polymerized in the presence of the first phase and second phase polymer; and c) reacting a polyfunctional amine and the product formed from step b) to produce the multiphase polymer.

* * * * *